US012688117B2

(12) United States Patent
Heymann et al.

(10) Patent No.: US 12,688,117 B2
(45) Date of Patent: Jul. 21, 2026

(54) NON-CONTIGUOUS DATA TRANSFER TECHNIQUES WITH MULTIPLE DIGITAL INTERFACES

(71) Applicant: Mellanox Technologies, Ltd., Yokneam (IL)

(72) Inventors: Omer Heymann, Tzofit (IL); Daniel Marcovitch, Yokne'am Illit (IL); Ortal Ben Moshe, Hevel Megiddo (IL); Ran Avraham Koren, Haifa (IL); Ariel Shahar, Jerusalem (IL); Kaushal Agarwal, Banglore (IN); Tsahi Daniel, Tel Aviv (IL); Idan Burstein, Acre (IL); Richard Leigh Graham, Knoxville, TN (US); Yong Qin, Lafayette, CA (US); Craig Brian Stunkel, St. Louis, MO (US)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/962,793

(22) Filed: Nov. 27, 2024

(65) Prior Publication Data

US 2026/0147705 A1 May 28, 2026

(51) Int. Cl.
*G06F 12/02* (2006.01)
*G06F 9/451* (2018.01)
(Continued)

(52) U.S. Cl.
CPC ............ *G06F 12/023* (2013.01); *G06F 9/451* (2018.02); *G06F 12/0802* (2013.01); *G06F 12/1081* (2013.01); *G06F 13/28* (2013.01)

(58) Field of Classification Search
None
See application file for complete search history.

(56) References Cited

U.S. PATENT DOCUMENTS

2005/0060441 A1 * 3/2005 Schmisseur ............. G06F 13/28
710/22
2020/0301861 A1 * 9/2020 Yu ....................... G06F 9/30038
(Continued)

OTHER PUBLICATIONS

Girolamo et al. (Network-Accelerated Non-Contiguous Memory Transfers) ACM ISBN 978-1-4503-6229-0/19/ Nov. 2019, pp. 14 (Year: 2019).*

*Primary Examiner* — Kaushikkumar M Patel
(74) *Attorney, Agent, or Firm* — Lowenstein Sandler LLP

(57) ABSTRACT

A data transfer controller connected to a first digital interface of a computer system receives an instruction to prepare a plurality of non-contiguous data elements in a memory of the computer system for transfer to a peripheral device connected to the first digital interface. The data elements are read from the memory of the computer system via a plurality of gather transactions on a second digital interface. The second digital interface is connected to the data transfer controller and the memory. The second digital interface allows for use of a subset of overhead data of the first digital interface for the gather transactions. The data elements are written into a contiguous data block in a buffer. An indication that the contiguous data block is available for transfer from the buffer to the peripheral device via the first digital interface is provided to the peripheral device via the first digital interface.

26 Claims, 13 Drawing Sheets

400

RECEIVE, BY A DATA TRANSFER CONTROLLER CONNECTED TO A FIRST DIGITAL INTERFACE OF A COMPUTER SYSTEM, AN INSTRUCTION TO PREPARE A PLURALITY OF NON-CONTIGUOUS DATA ELEMENTS IN A MEMORY OF THE COMPUTER SYSTEM FOR TRANSFER TO A PERIPHERAL DEVICE CONNECTED TO THE FIRST DIGITAL INTERFACE 402

READ, VIA A PLURALITY OF GATHER TRANSACTIONS ON A SECOND DIGITAL INTERFACE, THE PLURALITY OF NON-CONTIGUOUS DATA ELEMENTS FROM THE MEMORY OF THE COMPUTER SYSTEM, WHEREIN THE SECOND DIGITAL INTERFACE IS CONNECTED TO THE DATA TRANSFER CONTROLLER AND THE MEMORY OF THE COMPUTER SYSTEM, AND WHEREIN THE SECOND DIGITAL INTERFACE ALLOWS FOR USE OF A SUBSET OF OVERHEAD DATA OF THE FIRST DIGITAL INTERFACE FOR THE PLURALITY OF GATHER TRANSACTIONS 404

WRITE THE PLURALITY OF NON-CONTIGUOUS DATA ELEMENTS INTO A CONTIGUOUS DATA BLOCK IN A BUFFER 406

PROVIDE, TO THE PERIPHERAL DEVICE VIA THE FIRST DIGITAL INTERFACE, AN INDICATION THAT THE CONTIGUOUS DATA BLOCK IS AVAILABLE FOR TRANSFER FROM THE BUFFER TO THE PERIPHERAL DEVICE VIA THE FIRST DIGITAL INTERFACE 408

(51) Int. Cl.
G06F 12/0802 (2016.01)
G06F 12/1081 (2016.01)
G06F 13/28 (2006.01)

(56) References Cited

U.S. PATENT DOCUMENTS

| | | | | |
|---|---|---|---|---|
| 2020/0356503 | A1* | 11/2020 | Zang ....................... | G06F 13/24 |
| 2021/0157753 | A1* | 5/2021 | Isenegger ........... | G06F 16/9024 |
| 2022/0222075 | A1* | 7/2022 | Pawlowski ......... | G06F 9/30032 |
| 2025/0156100 | A1* | 5/2025 | Warner ................ | G06F 3/0679 |
| 2026/0003810 | A1* | 1/2026 | Hong ...................... | G06F 13/28 |

* cited by examiner

LAYER 202n

LAYER 202B

LAYER 202A

200A

LAYER OVERHEAD 212A

LAYER OVERHEAD 212n

DATA 210

LAYER OVERHEAD 212n

LAYER OVERHEAD 212B

LAYER OVERHEAD 212A

208A

LAYER 202n

· · ·

LAYER 202B

LAYER 202A

200B

208B

| LAYER OVERHEAD 212A | LAYER OVERHEAD 212B | LAYER OVERHEAD 212n | DATA 210 | LAYER OVERHEAD 212n | LAYER OVERHEAD 212A |
|---|---|---|---|---|---|

400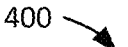

RECEIVE, BY A DATA TRANSFER CONTROLLER CONNECTED TO A FIRST DIGITAL INTERFACE OF A COMPUTER SYSTEM, AN INSTRUCTION TO PREPARE A PLURALITY OF NON-CONTIGUOUS DATA ELEMENTS IN A MEMORY OF THE COMPUTER SYSTEM FOR TRANSFER TO A PERIPHERAL DEVICE CONNECTED TO THE FIRST DIGITAL INTERFACE 402

READ, VIA A PLURALITY OF GATHER TRANSACTIONS ON A SECOND DIGITAL INTERFACE, THE PLURALITY OF NON-CONTIGUOUS DATA ELEMENTS FROM THE MEMORY OF THE COMPUTER SYSTEM, WHEREIN THE SECOND DIGITAL INTERFACE IS CONNECTED TO THE DATA TRANSFER CONTROLLER AND THE MEMORY OF THE COMPUTER SYSTEM, AND WHEREIN THE SECOND DIGITAL INTERFACE ALLOWS FOR USE OF A SUBSET OF OVERHEAD DATA OF THE FIRST DIGITAL INTERFACE FOR THE PLURALITY OF GATHER TRANSACTIONS 404

WRITE THE PLURALITY OF NON-CONTIGUOUS DATA ELEMENTS INTO A CONTIGUOUS DATA BLOCK IN A BUFFER 406

PROVIDE, TO THE PERIPHERAL DEVICE VIA THE FIRST DIGITAL INTERFACE, AN INDICATION THAT THE CONTIGUOUS DATA BLOCK IS AVAILABLE FOR TRANSFER FROM THE BUFFER TO THE PERIPHERAL DEVICE VIA THE FIRST DIGITAL INTERFACE 408

FIG. 4A

420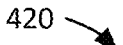

RECEIVE, BY A DATA TRANSFER CONTROLLER CONNECTED TO A FIRST DIGITAL INTERFACE OF A COMPUTER SYSTEM, AN INSTRUCTION TO DISTRIBUTE A PLURALITY OF DATA ELEMENTS OF A CONTIGUOUS DATA BLOCK TO A PLURALITY OF NON-CONTIGUOUS ADDRESSES IN A MEMORY OF THE COMPUTER SYSTEM, WHEREIN THE CONTIGUOUS DATA BLOCK IS ASSOCIATED WITH A PERIPHERAL DEVICE CONNECTED TO THE FIRST DIGITAL INTERFACE 422

RECEIVE, FROM THE PERIPHERAL DEVICE VIA THE FIRST DIGITAL INTERFACE, AN INDICATION THAT A WRITE TRANSACTION USING THE FIRST DIGITAL INTERFACE IS COMPLETE, WHEREIN THE WRITE TRANSACTION CORRESPONDS TO A TRANSFER OF THE CONTIGUOUS DATA BLOCK FROM THE PERIPHERAL DEVICE TO A BUFFER 424

READ THE PLURALITY OF DATA ELEMENTS FROM THE CONTIGUOUS DATA BLOCK IN THE BUFFER 426

WRITE, VIA A PLURALITY OF SCATTER TRANSACTIONS ON THE SECOND DIGITAL INTERFACE, THE PLURALITY OF DATA ELEMENTS TO THE PLURALITY OF NON-CONTIGUOUS ADDRESSES IN THE MEMORY OF THE COMPUTER SYSTEM, WHEREIN THE SECOND DIGITAL INTERFACE IS CONNECTED TO THE DATA TRANSFER CONTROLLER AND THE MEMORY OF THE COMPUTER SYSTEM, AND WHEREIN THE SECOND DIGITAL INTERFACE ALLOWS FOR USE OF A SUBSET OF OVERHEAD DATA OF THE FIRST DIGITAL INTERFACE FOR THE PLURALITY OF SCATTER TRANSACTIONS 428

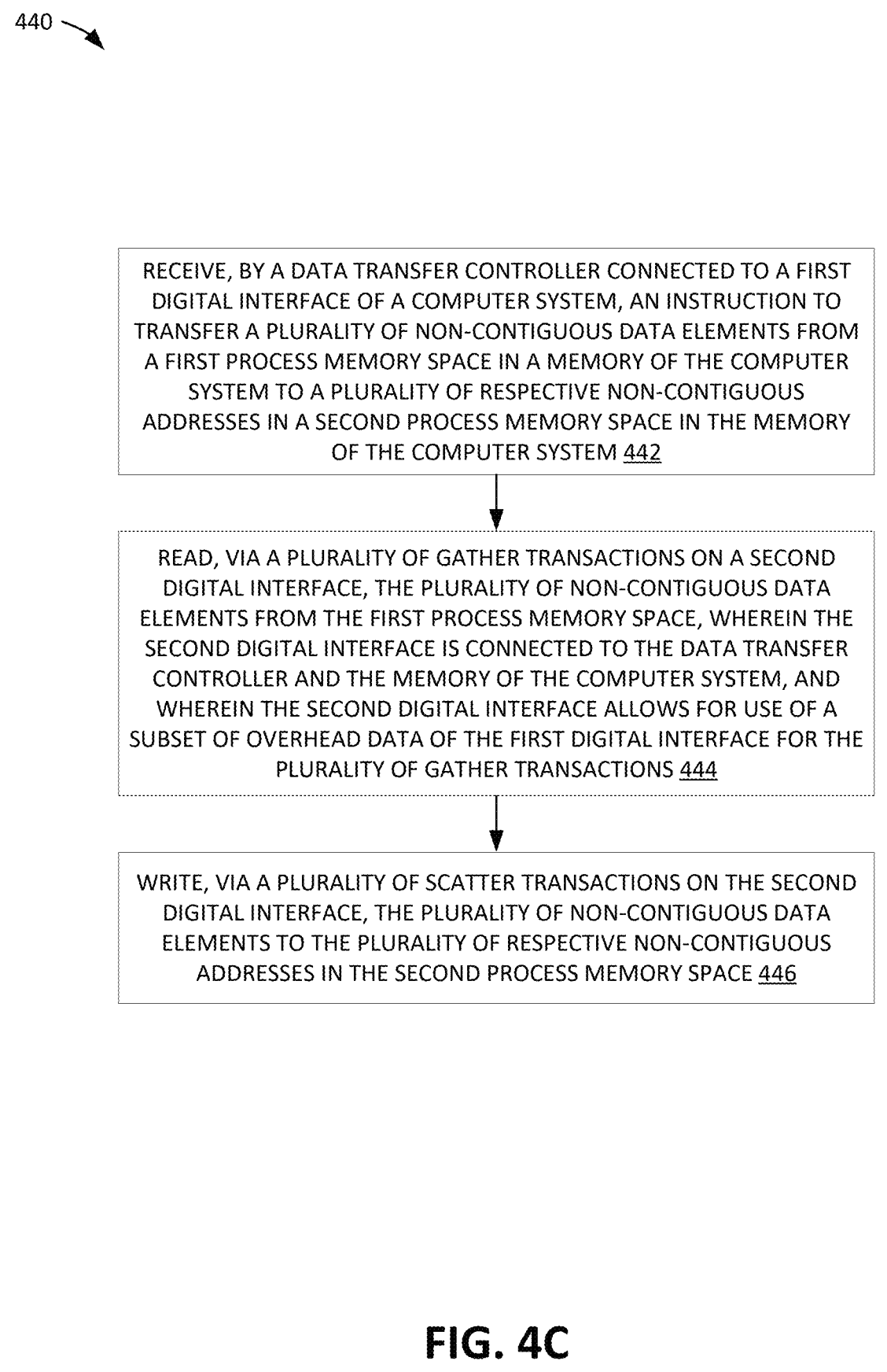

RECEIVE, BY A DATA TRANSFER CONTROLLER CONNECTED TO A FIRST DIGITAL INTERFACE OF A COMPUTER SYSTEM, AN INSTRUCTION TO TRANSFER A PLURALITY OF NON-CONTIGUOUS DATA ELEMENTS FROM A FIRST PROCESS MEMORY SPACE IN A MEMORY OF THE COMPUTER SYSTEM TO A PLURALITY OF RESPECTIVE NON-CONTIGUOUS ADDRESSES IN A SECOND PROCESS MEMORY SPACE IN THE MEMORY OF THE COMPUTER SYSTEM 442

READ, VIA A PLURALITY OF GATHER TRANSACTIONS ON A SECOND DIGITAL INTERFACE, THE PLURALITY OF NON-CONTIGUOUS DATA ELEMENTS FROM THE FIRST PROCESS MEMORY SPACE, WHEREIN THE SECOND DIGITAL INTERFACE IS CONNECTED TO THE DATA TRANSFER CONTROLLER AND THE MEMORY OF THE COMPUTER SYSTEM, AND WHEREIN THE SECOND DIGITAL INTERFACE ALLOWS FOR USE OF A SUBSET OF OVERHEAD DATA OF THE FIRST DIGITAL INTERFACE FOR THE PLURALITY OF GATHER TRANSACTIONS 444

WRITE, VIA A PLURALITY OF SCATTER TRANSACTIONS ON THE SECOND DIGITAL INTERFACE, THE PLURALITY OF NON-CONTIGUOUS DATA ELEMENTS TO THE PLURALITY OF RESPECTIVE NON-CONTIGUOUS ADDRESSES IN THE SECOND PROCESS MEMORY SPACE 446

FIG. 4C

NON-CONTIGUOUS DATA TRANSFER TECHNIQUES WITH MULTIPLE DIGITAL INTERFACES

TECHNICAL FIELD

Aspects and embodiments of the present disclosure relate to data transfer in computer systems, and in particular to non-contiguous data transfer techniques with multiple digital interfaces.

BACKGROUND

Direct memory access (DMA) enables a device on a computer system to transfer data to or from system memory without involving the CPU, thus freeing the CPU to perform other tasks while the transfer is in progress. DMA may provide high throughput for data-intensive input/output transactions, such as storage reads/writes or network communications. DMA may also be used for copying data from one memory location to another. DMA controllers may provide various parameters for controlling data transfer, such as starting address, ending address, stride, etc. These parameters may be accessible to the computer system via communications libraries or drivers.

BRIEF DESCRIPTION OF DRAWINGS

Various embodiments in accordance with the present disclosure will be described with reference to the drawings, in which:

FIG. 4A is a flow diagram of an example method for providing non-contiguous data transfer with multiple digital interfaces, in accordance with an embodiment;

FIG. 4B is a flow diagram of an example method for providing non-contiguous data transfer with multiple digital interfaces, in accordance with an embodiment;

FIG. 4C is a flow diagram of an example method for providing non-contiguous data transfer with multiple digital interfaces, in accordance with an embodiment;

DETAILED DESCRIPTION

Figure 1A:
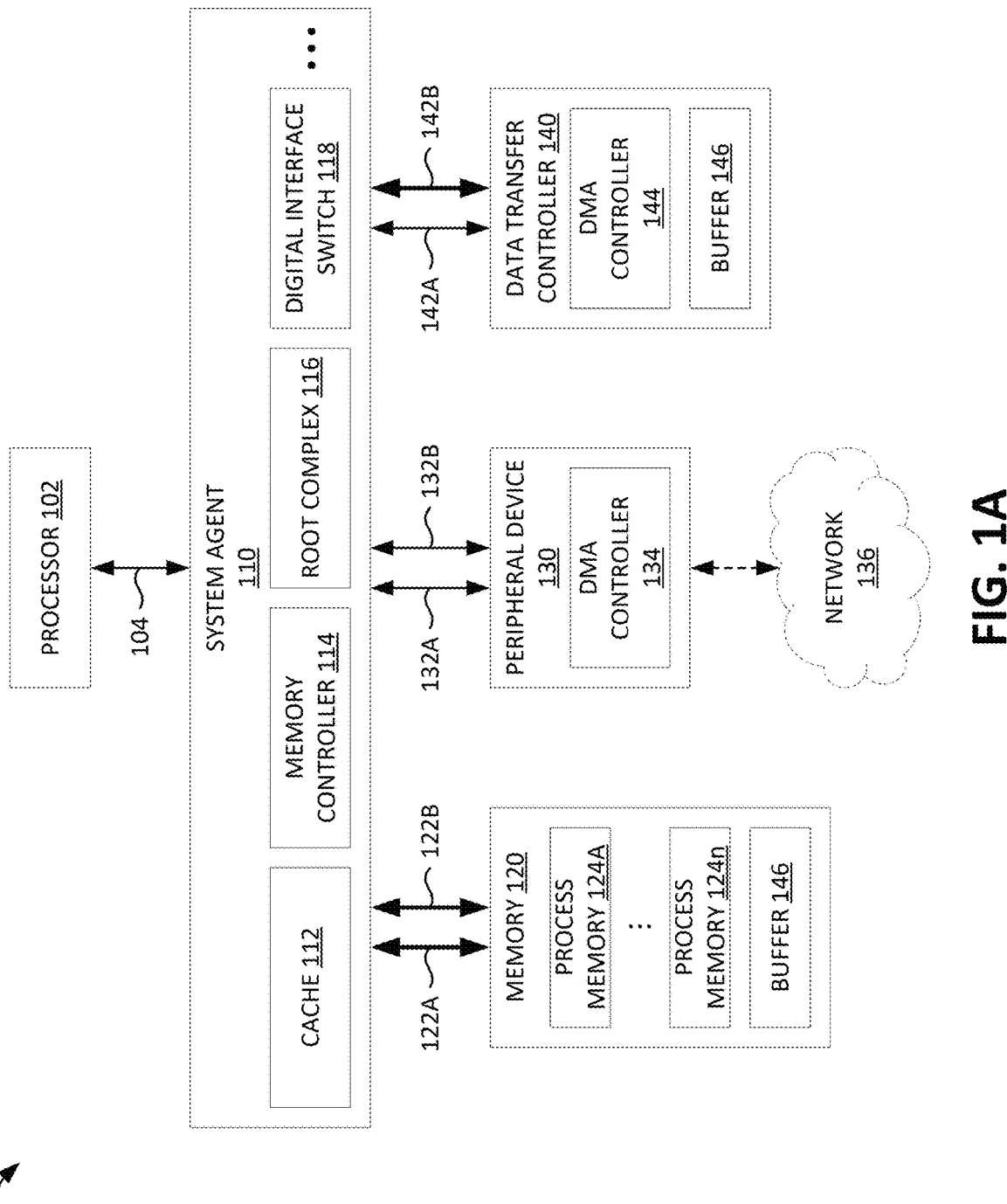
FIG. 1A is a block diagram of an example system architecture providing non-contiguous data transfer techniques with multiple digital interfaces, in accordance with an embodiment.

Aspects of the present disclosure relate to non-contiguous data transfer techniques with multiple digital interfaces. Computer systems often include a variety of devices connected to the CPU via one or more digital interfaces. For example, memory modules may connect to the CPU via a Double Data Rate (DDR) interface, hard disk drives may connect via a Serial AT Attachment (SATA) interface, and network interface controllers (NICs) may connect via a Peripheral Component Interconnect Express (PCIe) interface. Each interface may be associated with information overhead that provides error correction, destination addressing, and other functions at the cost of data throughput.

A device may transfer data to or from system memory using DMA techniques over the connecting interface(s). For example, a network interface card (NIC) connected via PCIe may use DMA to transfer network data to memory (or vice versa) without involving the CPU. The NIC may encapsulate a data element and its destination address (and other DMA-relevant parameters) in a PCIe packet and send the packet over the PCIe interface to a memory controller of the system (e.g., a memory management unit (MMU)). A communication library or driver for the NIC may provide a software interface for enabling and coordinating these DMA transactions.

The above-described systems may face several challenges relating to transferring data over digital interfaces to or from non-contiguous addresses within system memory. Among these challenges, without limitation, are: (i) interface overhead associated with non-contiguous transfers, (ii) operational complexity of alternative data pathways for non-contiguous data transfers, and (iii) incompatibility of alternative data pathways with virtual addressing schemes. These example challenges and other challenges are further described below.

First, the above-described systems may experience excessive interface overhead when transferring non-contiguous data elements to or from system memory. Revisiting the NIC/PCIe example, a NIC may initiate separate DMA transactions for each non-contiguous data element if the data elements cannot be transferred in a single transaction (e.g., when a DMA stride parameter cannot address all non-contiguous data elements). The NIC may encapsulate these DMA transactions in separate PCIe packets, which may incur substantial overhead (e.g., from the transaction, data link, and physical layers) compared to a smaller number of DMA transactions and PCIe packets that may be used for contiguous data elements. Other devices and other digital interfaces may experience similar information overhead. As a result of this challenge, systems may experience inefficient data transfers which may consume excessive resources (e.g., interface bandwidth, power) and which may introduce excessive latency. These inefficient data transfers may further interfere with other devices on a system, e.g., if the digital interface is a shared bus.

Second, the above-described systems may experience excessive operational complexity for solutions to the first challenge that involve alternative data pathways for non-contiguous data transfers. An alternative data pathway may include, for example, a second device that communicates with the first device (e.g., the NIC) and system memory over an alternative digital interface to reduce some of the interface overhead associated with the first challenge. However, introducing an alternative data pathway to a system may bring additional complexity related to synchronization between the devices involved, as well as complexity related to orchestration from the software perspective. For example, an alternative data pathway may require additional drivers and communication libraries. As a result of this challenge, system developers and users may devote excessive time and resources to configuring these systems to accommodate alternative data pathways.

Third, and related to the second challenge, the above-described systems may experience incompatibilities between alternative data pathways and Shared Virtual Addressing (SVA) or other virtual addressing schemes that enable devices and the CPU to work in the same address space. Revisiting the previous NIC/PCIe example, an alternative data pathway that operates outside the PCIe interface (e.g., to solve aspects of the first challenge by avoiding PCIe overhead) may be incompatible with SVA because it may be unable to transfer a Process Address Space ID (PASID) that is often included as a prefix in a PCIe packet. As a result of this challenge, devices using alternative data pathways may be unable to use application virtual addresses or perform DMA transactions without pinning memory pages. As in the second challenge, system developers and users may thus devote excessive time and resources to accommodate alternative data pathways in SVA contexts.

Aspects of the present disclosure address the above challenges and other challenges by using non-contiguous data transfer techniques with multiple digital interfaces. An example system may provide one or more of the following aspects: (i) efficient non-contiguous data transfers using a data transfer controller connected to the system via a separate control plane and data plane digital interfaces, (ii) seamless coordination between a data transfer device and a peripheral device from a software perspective, and (iii) compatibility of a data transfer device with virtual addressing schemes of a control plane digital interface. These aspects are further described below.

In an embodiment, a computer system includes a data transfer controller connected to the computer system via a control plane digital interface and a data plane digital interface. The data plane digital interface can enable the data transfer controller to copy non-contiguous data in system memory into a contiguous data block without incurring substantial overhead. A peripheral device connected to the system via a digital interface with more overhead may thus transfer the contiguous data block more efficiently. A similar process may be performed in reverse to move data from the peripheral device into non-contiguous addresses in memory. Revisiting the NIC/PCIe example, a data transfer device using a low-overhead interface (e.g., DDR) may copy non-contiguous data to and from non-contiguous addresses in memory without incurring the same quantity of overhead as the NIC may otherwise incur via PCIe. The NIC may thus read/write the contiguous data block with fewer PCIe transactions. Accordingly, computer systems using this technique may perform efficient data transfers with reduced overhead, which may in turn reduce power consumption, latency, and bandwidth usage. These transfers may be less burdensome on other devices (e.g., on the PCIe bus) and on the system as a whole.

In an embodiment, a communications library accessible by a peripheral driver and an accelerator driver allows for seamless coordination between a data transfer device using a control plane digital interface and a peripheral device using the same digital interface. The data transfer controller may appear, from a software perspective, similar to the peripheral devices for control purposes, with underlying data plane digital interface being transparent. Thus, software tools and principles associated with the control plane digital interface may be reused to control the data transfer controller. The data transfer controller and peripheral device may be coordinated at the hardware, driver, or library level, and the communications library may present a unified interface for initiating contiguous and non-contiguous data transfers in software. Accordingly, this technique results in reduced time and resource requirements for configuration of these systems.

In an embodiment, a data transfer device using the same digital interface as the peripheral device for the control plane is compatible with virtual addressing schemes of the digital interface. The control plane digital interface may have aspects that are relevant to virtual addressing (e.g., PASID data) while the data plane digital interface may allow for use of less overhead data to provide the efficiencies previously described. Thus, the data transfer controller may be used with virtual addressing schemes in the same manner as the peripheral device. Accordingly, computer systems using this technique may have improved compatibility with virtual addressing schemes and other virtualized contexts. Furthermore, this technique results in reduced time and resource requirements for managing virtualized contexts on the above systems.

FIG. 1A is a block diagram of an example system architecture 100A providing non-contiguous data transfer techniques with multiple digital interfaces, in accordance with an embodiment. System architecture 100A (also referred to as "system" herein) includes processor 102, system agent 110, memory 120, peripheral device 130, and data transfer controller 140. In an embodiment, system 100A may have more or fewer components than those depicted in FIG. 1A. For example, system 100A may include additional processors or additional peripherals (e.g., as described with reference to FIG. 1B). In various embodiments, system architecture 100A may be, may include, or may be included in a computer system such as computer system 500 of FIG. 5. For example, system 100A may be a personal computer (PC), a laptop computer, a notebook computer, a mobile phone, a smartphone, a tablet computer, a digital assistant, a rackmount server, a router computer, a system-on-chip (SoC), or similar computing device. In various embodiments, system architecture 100A may be, may include, or may be included in an accelerator device such as a graphics processing unit (GPU), data processing unit (DPU), or similar.

Processor 102 and memory 120 may store and execute data and operations. Processor 102 may include one or more processor cores or one or more discrete processor modules linked together. Memory 120 may include one or more memory modules (e.g., DRAM or SRAM modules). Memory 120 may further include process memories 124A-n, which may be virtual address spaces associated with respective processes executed by processor 102. The respective processes may be, for example, applications that run on different processor cores or in different threads managed by an operating system. In another example, the respective processes may be associated with kernels running on a GPU. Further examples and descriptions of processors and memory are provided with reference to FIG. 5.

System agent 110 may connect various components of system 100A to processor 102 and may provide various functions for processor 102 and other components. System agent 110 may include various submodules for these and other purposes. Example submodules depicted in FIG. 1A include cache 112, memory controller 114, root complex 116, and digital interface switch 118. System agent 110 may include more or fewer submodules in various embodiments.

In an embodiment, system agent 110 includes submodules for memory management, such as cache 112 and memory controller 114. Cache 112 may be a cache of a single- or multi-level cache system. For example, cache 112 may be an L1, L2, L3, or other level of cache. Cache 112 or other caches may be included in processor 102, system agent 110, or elsewhere in system 100A. Memory controller 114 may manage memory 120 and the flow of data between memory 120, processor 102, and other components of system 100A. For example, memory controller 114 may include logic for reading, writing, and refreshing DRAM cells of memory 120. In another example, memory controller 114 may provide memory management unit (MMU) functions, such as virtual addressing.

In an embodiment, system agent 110 includes digital interfaces for communicating with other components or for facilitating communication between submodules of system agent 110. Digital interfaces 104, 122A-B, 132A-B, and 142A-B are depicted and FIG. 1A, and other digital interfaces may be included in various embodiments. Examples of digital interfaces that may be used by system agent 110 include DDR (and related types such as LPDDR, GDDR, etc.), PCIe, Compute Express Link™ (CXL), NVLink™, NVSwitch™, InfiniBand™, Thunderbolt™, Ethernet, Universal Serial Bus (USB), Serial Peripheral Interface (SPI), or similar. System agent 110 may include, for a respective digital interface, a root complex (e.g., root complex 116), host bridge, or similar submodule for mediating communications between the CPU and other components on the respective digital interface. System agent 110 may include, for a respective digital interface, a digital interface switch (e.g., switch 118), router, or similar submodule for mediating communications between components on the respective digital interface. System agent 110 may include multiple root complexes, digital interfaces switches, or other relevant submodules for managing one or more digital interfaces.

A component of system 100A may be connected to system agent 110, processor 102, and/or other components via one or more digital interfaces. In an embodiment, a component may use a digital interface for a control plane connection, such as for sending and receiving commands and signals. The component may use the same or a different digital interface for a data plane connection, such as for sending and receiving data in response to commands and signals on the control plane. In an embodiment, digital interfaces 122A, 132A, and 142A may correspond to control plane digital interfaces, and digital interfaces 122B, 132B, and 142B may correspond to data plane digital interfaces. In an embodiment, control and data plane interfaces 122A-B are a DDR interface, control and data plane interfaces 132A-B are a PCIe interface, control plane interface 142A is a PCIe interface (or a modified PCIe interface as described with reference to FIG. 2A-D), and data plane interface 142 is a DDR interface. Modified digital interfaces are further described with respect to FIG. 2A-B.

Peripheral device 130 may provide data input/output or data processing functions for system 100A. For example, peripheral device 130 may be a network interface controller (NIC) that connects system 100A to a network (e.g., network 136). In another example, peripheral device 130 may be a storage device such as a solid-state drive, hard disk drive, RAID controller, or similar. In yet another example, peripheral device 130 may provide specialized processing capabilities to supplement processor 102, such as in a GPU, DPU, or cryptographic processor. Other types of peripheral devices may be included in system 100A in various embodiments.

In an embodiment, peripheral device 130 includes DMA engine 134 for transferring data to or from memory 120. For example, a NIC peripheral device may transfer streaming data from network 136 directly to memory 120 (or vice versa) without involving processor 102. DMA controller 134 may transfer data to memory 120 by encapsulating the data in a packet (or other non-packet medium) compatible with a communication protocol of digital interface 132A-B and providing the packet to system agent 110 (e.g., memory controller 114), where the data may be forwarded to memory 120. System agent 110 may extract the data from the packet and/or repackage the data for digital interface 122A-B in various embodiments. The reverse process may occur for data transfers from memory 120 to peripheral device 130. DMA engine 134 may further provide or receive transfer metadata, such as source/destination addresses, length and stride parameters, semaphore requests and releases, or similar. Such metadata may be included with the data in the digital interface packet or may be included in separate packets. DMA engine 134 may further provide or receive overhead data associated with digital interface 132A-B, such as packet headers, CRC values, or similar.

In an embodiment, peripheral device 130 is associated with a software component such as a driver or communications library. The software component may expose functions and configurations of peripheral device 130 to an operating system, application, or other software components of system 100A. The software component may further expose functions and configurations of DMA controller 134 to enable other software to configure and initiate DMA transactions. In an embodiment, the software component conforms to a standardized interface (e.g., an API), enabling other software to interact with peripheral device 130 using standard techniques. In an embodiment, the software component may communicate with peripheral device 130 using control plane interface 132A.

Data transfer controller 140 may provide data transfer functions for non-contiguous data and other types of irregular data that a peripheral device (or other component) may be unable to transfer efficiently. For example, DMA controller 134 may be unable to address some types of non-contiguous data with stride parameters or similar parameters, and thus multiple DMA transactions may be used, each incurring overhead on digital interface 132A-B. In an embodiment, data transfer controller 140 includes DMA controller 144, which may be similar to aspects of DMA controller 134 of peripheral device 130. Data transfer controller 140 may communicate with and transfer data to/from memory 120 (e.g., via root complex 116 and memory controller 114). Data transfer controller 140 may also communicate with and transfer data to/from peripheral device 130 (e.g., via digital interface switch 118). Data transfer controller 140 may communicate with other components via control plane interface 142A, which may be a modified digital interface having less overhead than an unmodified digital interface. For example, digital interface 142A may be a modified version of digital interface 132A-B. Modified digital interfaces and respective modified communication protocols are further described with reference to FIG. 2. Data transfer controller 140 may send and receive data to/from other components via data plane interface 142B. In an embodiment, control plane interface 142A and data plane interface 142B may correspond to different digital interface. For example, data plane interface 142B may have less overhead (e.g., a subset of overhead) than control plane interface 142A, while control plane interface 142A may enable data transfer controller 140 to communicate directly with other components on the same digital interface, use virtual addressing, and other characteristics associated with the digital interface of control plane interface 142A.

In an embodiment, data transfer controller 140 and/or DMA controller 144 may perform operations for gathering non-contiguous data elements from memory 120 (e.g., from process memory 124A) into a contiguous data block in buffer 146 for transfer to peripheral device 130. In an embodiment, data transfer controller 140 and/or DMA controller 144 may perform operations for scattering data elements in a contiguous data block in buffer 146 to non-contiguous locations in memory 120 (e.g., in process memory 124A). The contiguous data block may have been previously placed in buffer 146 by peripheral device 130 and/or DMA controller 134. In an embodiment, data transfer controller 140 and/or DMA controller 144 may perform operations for transferring non-contiguous data elements from one memory region (e.g., process memory 124A) to another memory region (e.g., process memory 124n). These scatter, gather, and memory-to-memory operations may be performed more efficiently (e.g., with less overhead) over data plane interface 142B than over data plane interface 132B, as indicated by the thickness (e.g., bandwidth) of interfaces 132B and 142B depicted in FIG. 1A. Thus, peripheral device 130 may offload inefficient operations to data transfer controller 140 and operate instead on contiguous data blocks in buffer 146. In various embodiments, buffer 146 may be located in data transfer controller 140 (e.g., a device cache), in memory 120 (e.g., a dedicated virtual memory region), or elsewhere in system 100A (e.g., in cache 112 of system agent 110).

In an embodiment, data transfer controller 140 is associated with a software component such as a driver or communications library. The software component may expose functions and configurations of data transfer controller 140 to an operating system, application, or other software components of system 100A. The software component may further expose functions and configurations of DMA controller 144 to enable other software to configure and initiate DMA transactions. In an embodiment, the software component conforms to a standardized interface (e.g., an API), enabling other software to interact with data transfer controller 140 using standardized techniques. In various embodiments, peripheral device 130 and data transfer controller 140 may share the same software component or their respective software components may integrate with each other. Peripheral device 130 and data transfer controller 140 may further communicate directly with each other to exchange information (e.g., semaphores) about data transfers in progress. Thus, operations of data transfer controller 140 and/or coordination with peripheral device 130 may be transparent to other software components such as the operating system or application software. In an embodiment, the software component may communicate with data transfer controller 140 using control plane interface 142A.

In an embodiment, components of system 100A may be discrete components. For example, system agent 110 may correspond to northbridge and/or southbridge chips that are separate from processor 102 on a motherboard, memory 120 may correspond to one or more DIMM modules, and peripheral device 130 and data transfer controller 140 may correspond to discrete PCIe cards. In an embodiment, components of system 100A may be integrated components. For example, system 100A may correspond to a system-on-chip (SoC) with processor 102, system agent 110, memory 120, peripheral device 130, and data transfer controller 140 integrated on a single die or on multiple dies joined together by bond wires within a single package. Various embodiments may include a combination of discrete and integrated components. For example, another type of SoC may include processor 102 and system agent 110 in a single package, with memory 120, peripheral device 130, and data transfer controller 140 connected externally (e.g., as chips on a printed circuit board or as pluggable cards). In another example, some submodules of system agent 110 may be included in a package with processor 102 (e.g., cache 112 and memory controller 114), while other submodules of system agent 110 may be included in an external discrete chipset (e.g., root complex 116 and digital interface switch 118).

In an embodiment, data transfer controller 140 may be located physically, architecturally, or otherwise close to memory 120 and/or system agent 110, which may enable additional overhead-reducing modifications of control plane interface 142A. In one example, data transfer controller 140 may be located on a single die or within a single package along with processor 102 and/or system agent 110. This may enable modifications of a physical layer of digital interface 142 (e.g., as described with reference to FIGS. 2A-B), such as using more efficient coding schemes or similar. In another example, data transfer controller 140 may be located in system agent 110, such as near or in memory controller 114 (e.g., bypassing root complex 116 and/or digital interface switch 118). This may enable modifications of a data link layer of digital interface 142 (e.g., a described with reference to FIGS. 2A-B), such as reducing error correction or addressing overhead.

Figure 1B:
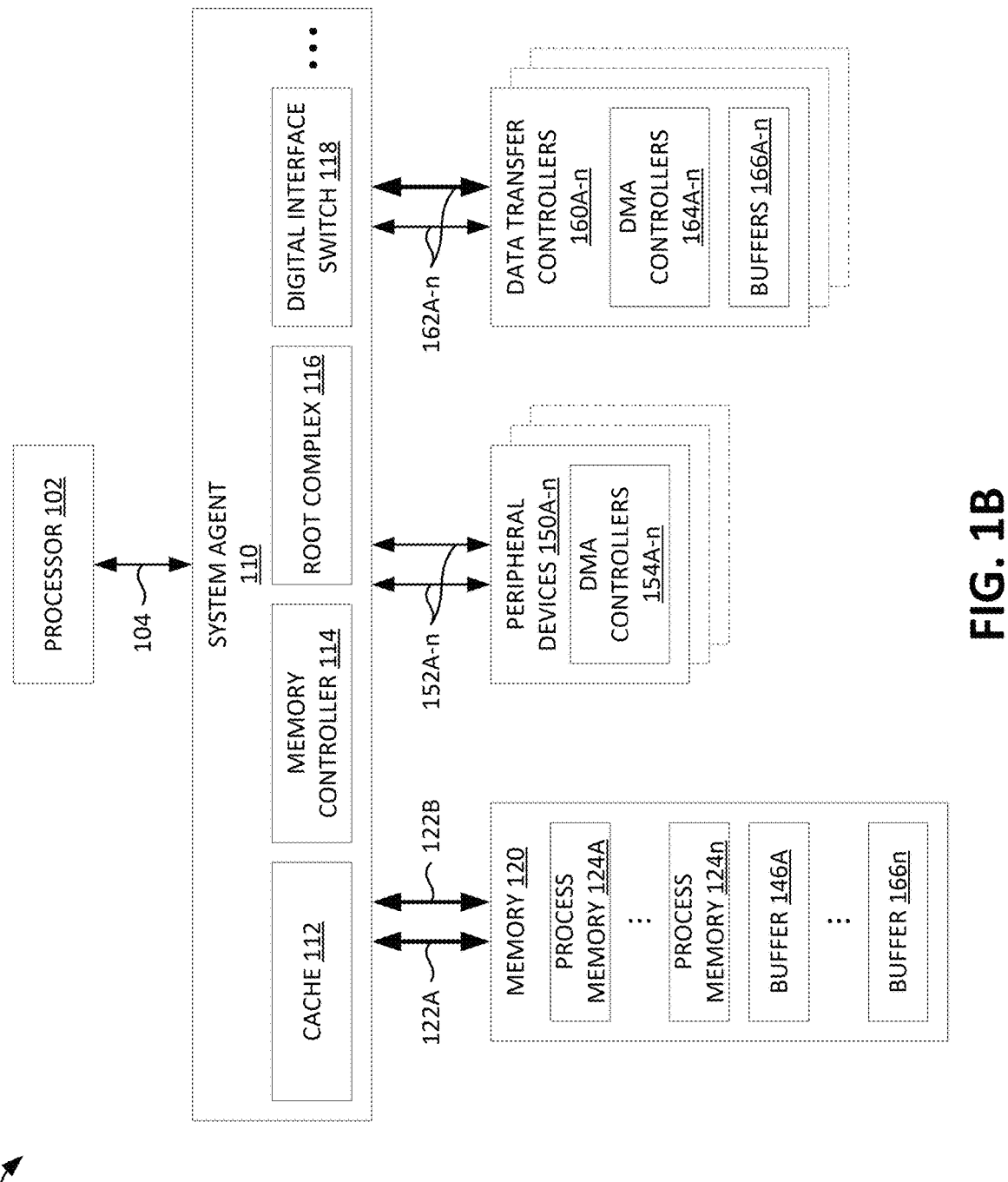
FIG. 1B is a block diagram of an example system architecture providing non-contiguous data transfer techniques with multiple digital interfaces, in accordance with an embodiment.

FIG. 1B is a block diagram of an example system architecture 100B providing non-contiguous data transfer techniques with multiple digital interfaces, in accordance with an embodiment. System architecture 100B (also referred to as "system" herein) includes processor 102, system agent 110, memory 120, one or more peripheral devices 150A-n, and one or more data transfer controllers 160A-n. In an embodiment, system 100B may have more or fewer components than those depicted in FIG. 1B. In various embodiments, system architecture 100B may be, may include, or may be included in a computer system such as computer system 500 of FIG. 5. For example, system 100B may be a personal computer (PC), a laptop computer, a notebook computer, a mobile phone, a smartphone, a tablet computer, a digital assistant, a rackmount server, a router computer, or similar computing device. In various embodiments, system architecture 100B may be, may include, or may be included in an accelerator device such as a graphics processing unit (GPU), data processing unit (DPU), or similar.

Peripheral devices 150A-n (and respective DMA controllers 154A-n) may each correspond to peripheral device 130 (and respective DMA controller 134) described with reference to FIG. 1A. Data transfer controllers 160A-n (and respective DMA controllers 164A-n and buffers 166A-n) may each correspond to data transfer controller 140 (and respective DMA controller 144 and buffer 146A-n). Similarly, control plane and data plane digital interfaces 152A-n may correspond to digital interfaces 132A-B, and control plane and data plane digital interfaces 162A-n may correspond to digital interfaces 142A-B.

In an embodiment, a peripheral device of peripheral devices 150A-n is associated with one or more data transfer controllers of data transfer controllers 160A-n. For example, a NIC may include one or more network interfaces and may associate with a respective data transfer controller for each interface. In an embodiment, a data transfer controller of data transfer controllers 160A-n is associated with one or more peripheral devices of peripheral devices 150A-n. For example, a data transfer controller may service an array of storage devices. In an embodiment, each peripheral device of peripheral devices 150A-n is associated with a respective data transfer controller of data transfer controllers 160A-n in a one-to-one association. Other combinations of peripheral devices and data transfer controllers may be used in various embodiments.

Figure 2A:
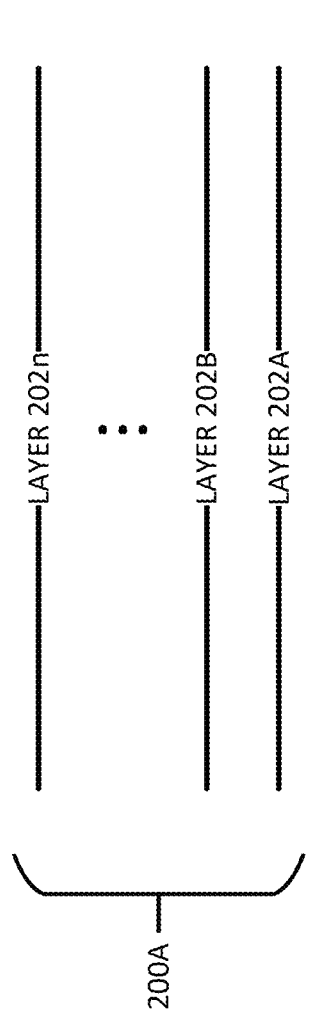
FIG. 2A illustrates a communication protocol of a digital interface and a respective communication protocol packet, in accordance with an embodiment.
Figure 2B:
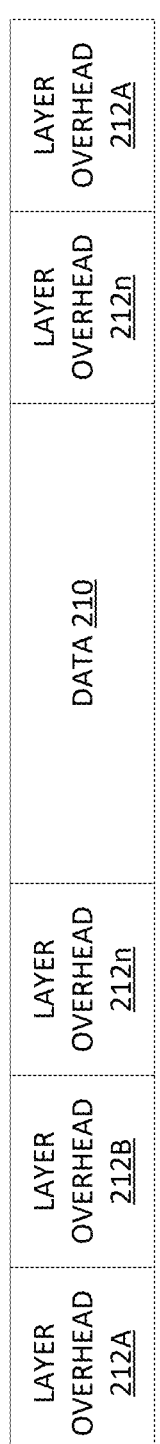
FIG. 2B illustrates a communication protocol of a digital interface and a respective communication protocol packet, in accordance with an embodiment.

FIGS. 2A-B illustrate a communication protocol 200A of a digital interface and a respective communication protocol packet 208A, in accordance with an embodiment.

Communication protocol 200A may correspond to one or more of digital interfaces 104, 122A-B, 132A-B, or 142A-B of FIGS. 1A-B.

Referring to FIG. 2A, communication protocol 200A may be a layered protocol including one or more protocol layers 202A-n. A layer of protocol layers 202A-n may have a specific function within communication protocol 200A and may interact with other layers (e.g., layers above and below) and other aspects of a system. For example, lower layers (e.g., 202A-B) may interact with system hardware and upper layers (e.g., 202n) may interact with application software. One or more of protocol layers 202A-n may correspond to one or more layers of the Open Systems Interconnection (OSI) model. The OSI model includes seven layers: (i) physical layer, (ii) data link layer, (iii) network layer, (iv) transport layer, (v) session layer, (vi) presentation layer, and (vii) application layer. The lower layers (e.g., layers (i) and (ii)) may interact with hardware aspects, and the upper layers (e.g., layers (vi) and (vii)) may interact with application software aspects. An example of a layered protocol is the PCIe protocol, which includes three layers: (i) physical layer, (ii) data link layer, and (iii) transaction layer. The Internet protocol suite is another example of a communication protocol having multiple layers.

Referring to FIG. 2B, communication protocol packet 208A includes data 210 and layer overhead data 212A-n. Layer overhead 212A may correspond to layer 202A of communication protocol 200A, layer overhead 212B may correspond to layer 202B, and so on. Layer overhead may include various information such as source/destination addresses, parity bits, CRC values, timestamps, version numbers, data types, etc.

Communication protocol 200A may include additional overhead data not depicted in FIG. 2B. For example, overhead data in a physical layer (e.g., layer 202A) may include encoding overhead, such as 2-bit overhead in $8b/10b$ encoding or clock embedding/recovery overhead. Such overhead may be transparent at the packet level. Thus, in this example, layer overhead 212A may correspond to layer 202B, layer overhead 212B to layer 202C, and so on. In another example, an upper protocol layer may define acknowledgement (e.g., ACK) packets to be sent in response to data packets. Such packets may constitute overhead in a set of packets of a communication sequence. Various other types of overhead data may be associated with communication protocol 200A.

Figures 2C, 2D:
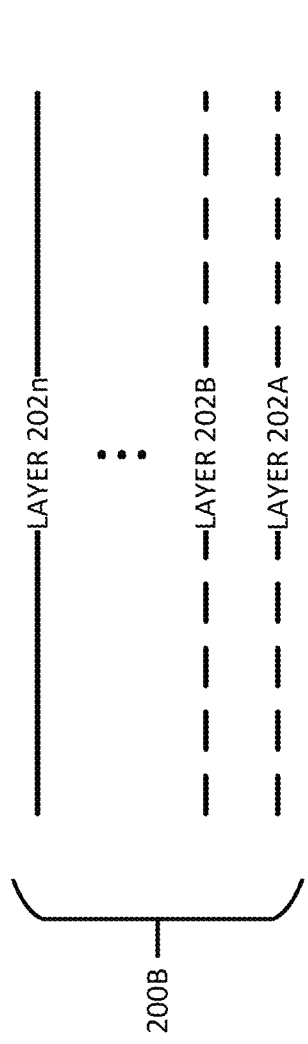
FIG. 2C illustrates a modified communication protocol of a modified digital interface and a respective modified communication protocol packet, in accordance with an embodiment.
FIG. 2D illustrates a modified communication protocol of a modified digital interface and a respective modified communication protocol packet, in accordance with an embodiment.

FIGS. 2C-D illustrate a modified communication protocol 200B of a modified digital interface and a respective modified communication protocol packet 208B, in accordance with an embodiment. Modified communication protocol 200B may correspond to one or more of digital interfaces 104, 122A-B, 132A-B, or 142A-B of FIGS. 1A-B. Modified communication protocol 200B may be a modified version of communication protocol 200A. The modified digital interface corresponding to modified communication protocol 200B may similarly be a modified version of the digital interface corresponding to communication protocol 200A.

Referring to FIG. 2C, modified communication protocol 200B includes a subset of layers 202A-n, some of which may be absent or modified relative to the layers of protocol 200A (e.g., as depicted by dashed lines). Referring to FIG. 2D, modified communication protocol packet 208B may include less layer overhead data 212A-n associated with the absent or modified layers (e.g., as depicted by dashed lines). Other types of overhead not depicted in modified communication protocol 200B may be absent or reduced as well (e.g., encoding overhead, ACK overhead).

In an embodiment, a lower protocol layer (e.g., a physical layer or data link layer) is absent or modified in modified communication protocol 200B. As described with reference to FIG. 1A, a data transfer controller may be located near/in system agent 110 and/or memory 120, which may permit modifications to lower protocol layers. For example, an encoding scheme may be changed to a more efficient encoding scheme (e.g., $128b/130b$ encoding), a clock signal may be separated from a data signal, error correction may be reduced or removed, or similar. In another example, addressing in a data link layer may be removed if a data transfer controller is placed in a point-to-point topology (e.g., a direct connection to a memory controller) rather than a switched topology (e.g., an indirect connection to a memory controller and other components via a digital interface switch).

In an embodiment, a middle or upper protocol layer is absent or modified in modified communication protocol 200B. For example, an ACK or other type of response/confirmation may be removed from a layer.

In an embodiment, an upper protocol layer is unmodified in modified communication protocol 200B. For example, a protocol layer that interacts with drivers, communication libraries, application software, etc. may be unmodified to provide an interface consistent with communication protocol 200A. Thus, from the software perspective, modified communication protocol 200B may be indistinguishable from communication protocol 200A while providing less overhead than communication protocol 200A.

In an embodiment, a communication protocol of a digital interface may be a single-layer protocol or may not be associated with a layered architecture. For example, protocols such as USB may not have well-defined layers. Other protocols, such as Serial Peripheral Interface (SPI) or Universal Asynchronous Receiver-Transmitter (UART), may define signals and timing requirements, but may not define application-level behavior as in OSI layer (vii) or PCIe layer (iii). A modified version of a single-layer or non-layered communication protocol may thus include other modifications rather than absent or modified layers. For example, clock signals, parity bits, or other aspects of a protocol may be removed if such aspects provide unnecessary overhead in view of characteristics of the data transfer controller (e.g., placement near memory on a modified interface).

In an embodiment, a communication protocol of a digital interface may not be a packetized protocol. For example, some serial protocols such as I²S may support streaming continuous data (e.g., audio data encoded in pulse-code modulation (PCM)) without discrete packet boundaries. As previously mentioned, protocol elements such as clock signals and parity bits may constitute overhead and may be removed or otherwise modified in a modified version of the protocol. More generally, various types of layered packetized, non-layered packetized, layered non-packetized, or non-layered non-packetized communication protocols, and modified versions thereof, may be used in various embodiments.

Figure 3A:
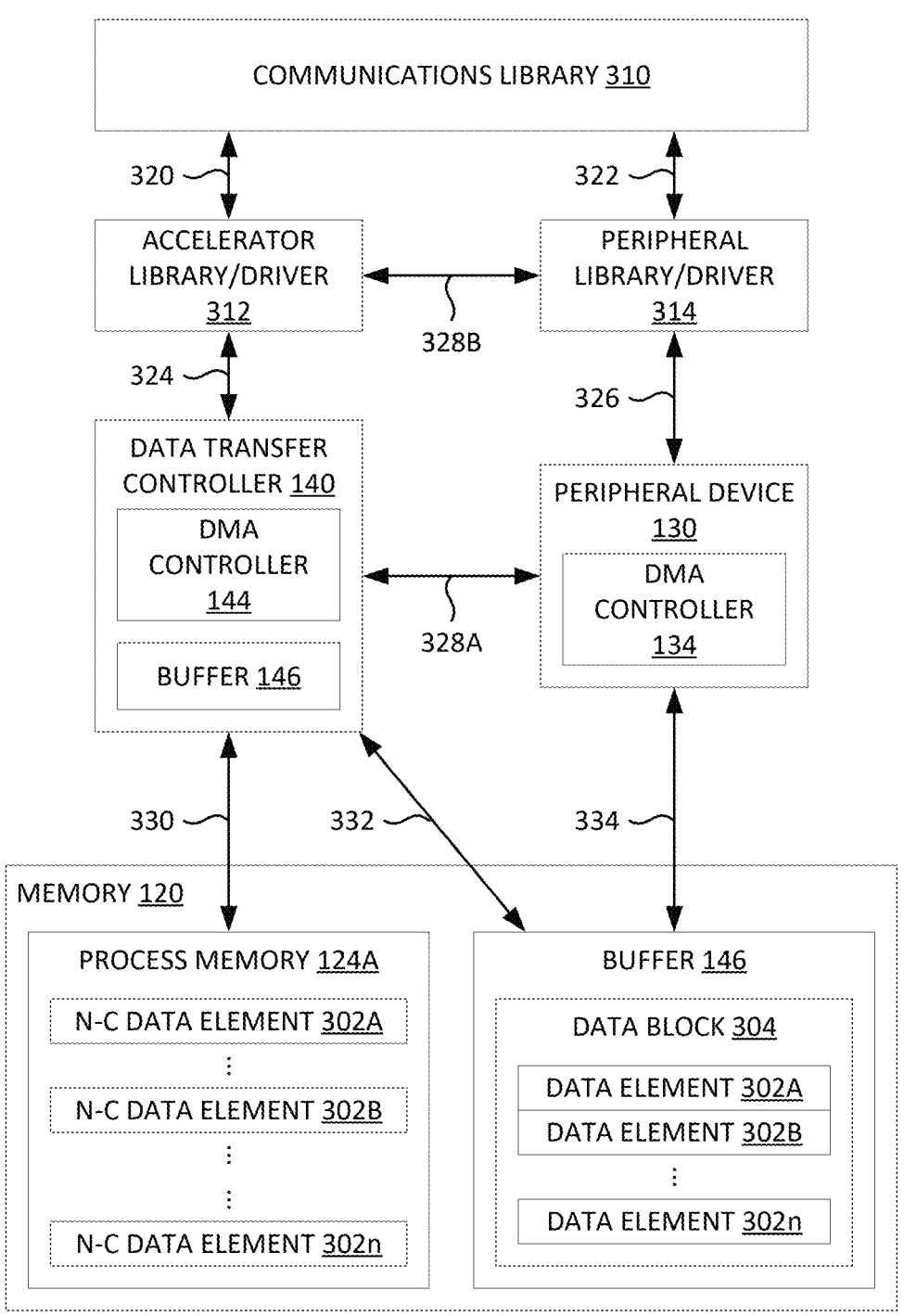
FIG. 3A is a block diagram illustrating scatter-gather data transfer operations with a data transfer controller and a peripheral device, in accordance with an embodiment.

FIG. 3A is a block diagram illustrating scatter-gather data transfer operations with a data transfer controller and a peripheral device, in accordance with an embodiment. Memory 120, peripheral device 130, and data transfer controller 140 may correspond to their respective counterparts in FIG. 1A. Other components of FIG. 1A-B are omitted for clarity. Data transfer controller 140 may be associated with an accelerator library or driver 312, which may provide a software interface to data transfer controller 140 for an operating system, other libraries, or application software. Peripheral device 130 may be associated with a peripheral library or driver 314, which may provide a software interface to peripheral device 130 for an operating system, other libraries, or application software. Communications library may be accessible by drivers 312 and 314 and allow for a unified interface for various communication workflows involving contiguous or non-contiguous data. In an embodiment, driver 312 and/or data transfer controller 140 may thus be transparent to other software interfacing with communications library 310. Other driver and library structures may be used in various embodiments. For example, a unified driver may provide aspects of drivers 312 and 314 as well as aspects of communications library 310. Communications library may thus be absent. In another example, driver 312 may be a plug-in module for or modification of driver 314. Communication channels 320-334 may be hardware (e.g., digital interfaces) and/or software (e.g., APIs) communication channels in various embodiments.

In an embodiment, data transfer controller 140 performs a gather operation to prepare data for transfer to peripheral device 130. Software (e.g., an operating system, an application) may initiate a peripheral data operation via communications library 310, such as sending data to the network or writing data to storage. Communications library 310 may be used to instruct driver 312 and/or data transfer controller 140 (e.g., via communication channels 320 and/or 324, which may correspond to digital interface 142A) to gather non-contiguous data elements 302A from process memory 124A and place them in a contiguous data block 304 in buffer 146 (which may be in memory 120 or data transfer controller 140 as previously described). Data transfer controller 140 may receive these instructions and perform these reads and writes using multiple digital interfaces and/or modified digital interfaces as previously described (e.g., via communication channels 330 and 332, which may correspond to digital interface 142B).

After completing transfer of non-contiguous data elements 302A-n to data block 304, data transfer controller 140 may indicate to peripheral device 130 that the data block is ready to be transferred (e.g., to network, to disk). Data transfer controller 140 may provide an indication via hardware (e.g., communication channel 328A), such as a semaphore, mutex, or other lock. Data transfer controller 140 may alternatively provide an indication via software using drivers 312 and 314 (e.g., via communication channels 324, 328B, and 326) or using communications library 310 (e.g., via communication channels 324, 320, 322, and 326). Data transfer controller 140 may provide hardware and/or software indications via control plane interface 142A. Peripheral device 130 may then transfer data block 304 using a digital interface as previously described (e.g., via communication channel 334, which may correspond to digital interface 132A-B). Gather operations are further described with reference to FIG. 4A.

In an embodiment, data transfer controller 140 performs a scatter operation to distribute data transferred to a buffer by peripheral device 130. Software may initiate a peripheral data operation via communications library 310, such as receiving data from the network or reading data from storage. Peripheral device 130 may transfer the data to data block 304 in buffer 146 using a digital interface as previously described (e.g., via communication channel 334, which may correspond to digital interface 132A-B). After the transfer to data block 304 is complete, peripheral device 130 may indicate to data transfer controller 140 that the data block is ready to be scattered to process memory 124A. Peripheral device 130 may provide an indication via hardware (e.g., communication channel 328A), such as a semaphore, mutex, or other lock. Peripheral device 130 may alternatively provide an indication via software using drivers 312 and 314 (e.g., via communication channels 326, 328B, and 324) or using communications library 310 (e.g., via communication channels 326, 322, 320, and 324). Data transfer controller 140 may receive hardware and/or software indications via control plane interface 142A.

After receiving the indication from peripheral device 130, data transfer controller 140 may read data elements 302A-n from data block 304 and scatter them to non-contiguous addresses in process memory 124A. Data transfer controller 140 may receive these indications and perform these reads and writes using multiple digital interfaces and/or modified digital interfaces as previously described (e.g., via communication channels 330 and 332, which may correspond to digital interface 142B). Scatter operations are further described with reference to FIG. 4B.

Figure 3B:
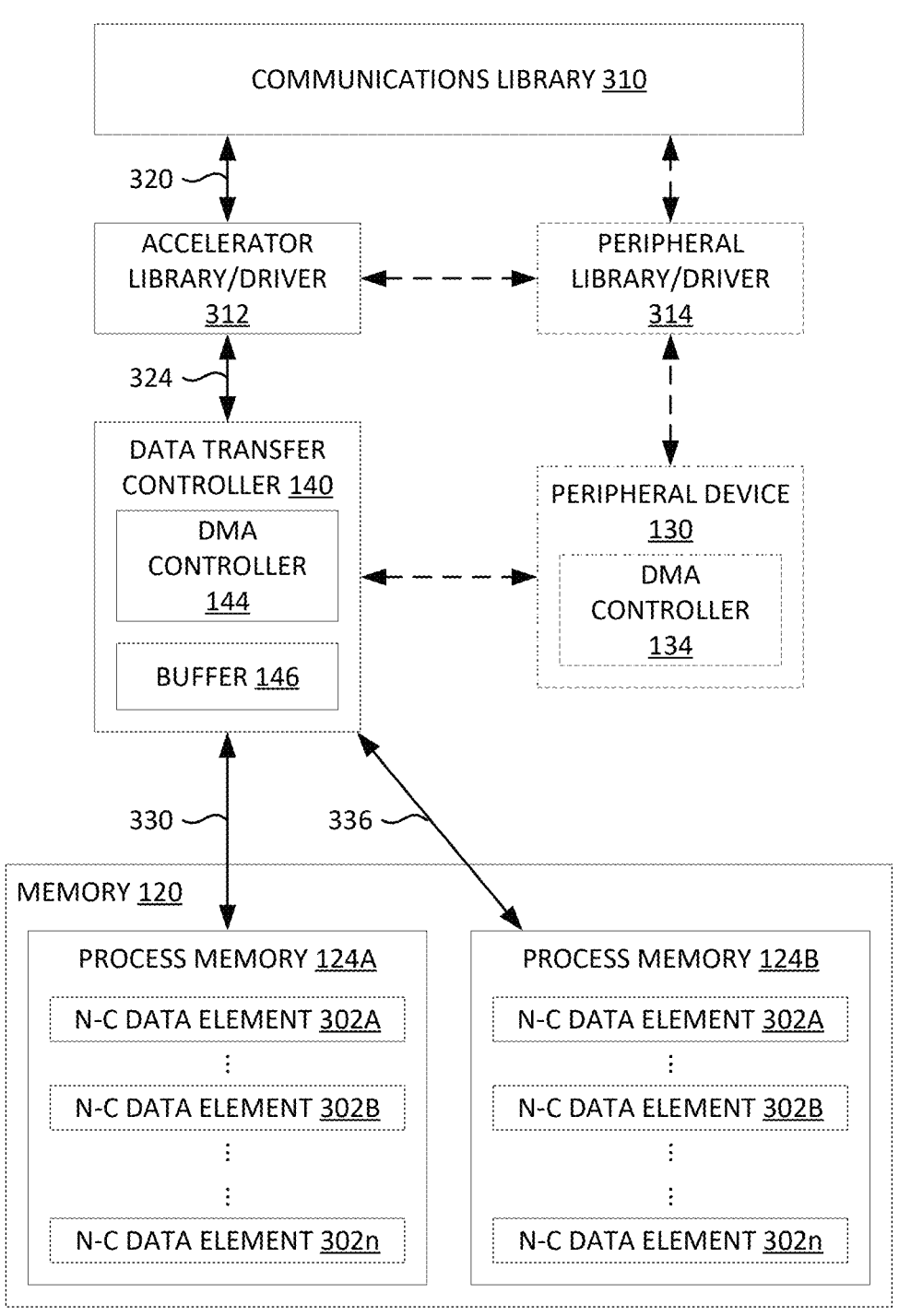
FIG. 3B is a block diagram illustrating memory-to-memory non-contiguous data transfer operations with a data transfer controller, in accordance with an embodiment.

FIG. 3B is a block diagram illustrating memory-to-memory non-contiguous data transfer operations with a data transfer controller, in accordance with an embodiment. The depicted components may correspond to their respective counterparts in FIG. 3A. Peripheral device 130 and driver 314 may not be involved in memory-to-memory operations (as indicated by dashed lines), but the same system architecture may be used for both scatter-gather operations and memory-to-memory operations. Thus, data transfer controller 140 may provide transparent acceleration for various data transfer operations from the software perspective.

In an embodiment, data transfer controller 140 performs a memory-to-memory transfer operation to copy non-contiguous data elements 302A-n from process memory 124A to process memory 124B. Software may initiate a memory-to-memory operation via communication library 310. Communications library 310 may be used to instruct driver 312 and/or data transfer controller 140 (e.g., via communication channels 320 and/or 324, which may correspond to control plane interface 142A) to gather non-contiguous data elements 302A from process memory 124A and scatter them to non-contiguous addresses in process memory 124A. Data transfer controller 140 may receive these instructions and perform these reads and writes using multiple digital interfaces and/or modified digital interfaces as previously described (e.g., via communication channels 330 and 336, which may correspond to digital interface 142B). Memory-to-memory operations are further described with reference to FIG. 4C.

FIG. 4A is a flow diagram of an example method 400 for providing non-contiguous data transfer with multiple digital interfaces, in accordance with an embodiment. Method 400 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 400. Method 400 may also be associated with a set of instructions stored on a non-transitory computer-readable medium (e.g., magnetic or optical disk, etc.). The instructions, when executed by a processing device, may cause the processing device to perform operations comprising the blocks of method 400. In an embodiment, method 400 is performed by the systems of FIGS. 1A-B or components thereof (e.g., processor 102, system agent 110, memory controller 114, data transfer controller 140, etc.). In an embodiment, method 400 is performed by computing system 500 of FIG. 5. In some embodiments, blocks depicted in FIG. 4A could be performed simultaneously or in a different order than depicted. Various embodiments may include additional blocks not depicted in FIG. 4A or a subset of blocks depicted in FIG. 4A.

At block 402, processing logic of a data transfer controller connected to a first digital interface of a computer system receives an instruction to prepare a plurality of non-contiguous data elements in a memory of the computer system for transfer to a peripheral device connected to the first digital interface. The data transfer controller may be data transfer controller 140 of FIG. 1A. The memory of the computer system may be memory 120 and/or process memories 124A-n. The peripheral device may be peripheral device 130. As previously described, the peripheral device may be a NIC, GPU, DPU, data storage device, or other types of devices in various embodiments. The first digital interface may be digital interfaces 132A-B and/or 142A (e.g., the data transfer controller control plane interface). The non-contiguous data elements may be data elements 302A-n of FIG. 3A (e.g., as depicted in process memory 124A). The instruction may be received from software (e.g., a driver or communication library). The instruction may be received via the first digital interface. In an embodiment, the instruction may be received via the second digital interface described below.

In an embodiment, the received instruction comprises a plurality of non-contiguous virtual memory addresses each addressable by a processor of the computer system, the data transfer controller, and the peripheral device. For example, the virtual memory addresses may be associated with a shared virtual addressing (SVA) scheme, shared virtual memory (SVM) scheme, or similar virtual address scheme. The virtual addresses may be associated with one or more process address space IDs (PASIDs) allocated and managed by an operating system. Each address of the plurality of non-contiguous virtual memory addresses may be associated with a respective data element of the plurality of non-contiguous data elements.

At block 404, the processing logic reads, via a plurality of gather transactions on a second digital interface, the plurality of non-contiguous data elements from the memory of the computer system, wherein the second digital interface is connected to the data transfer controller and the memory of the computer system, and wherein the second digital interface allows for use of a subset of overhead data of the first digital interface for the plurality of gather transactions. The second digital interface may be digital interfaces 122A-B and/or 142B (e.g., the data transfer controller data plane interface). The read may be performed by a DMA controller of the data transfer controller (e.g., DMA controller 144).

In an embodiment, the first digital interface corresponds to a control plane of the data transfer controller and the second digital interface corresponds to a data plane of the data transfer controller. The first digital interface further corresponds to a control plane and a data plane of the peripheral device. The second digital interface further corresponds to a control plane and a data plane of the memory of the computer system. The second digital interface may provide increased bandwidth, decreased latency, and/or reduced overhead relative to the first digital interface.

In an embodiment, the first digital interface is a modified Peripheral Component Interconnect Express (PCIe) interface. A PCIe interface may include a PCIe physical layer, a PCIe data link layer, and a PCIe transaction layer. One of the PCIe physical layer or the PCIe data link layer may be absent or modified in the modified PCIe interface. The transaction layer may be unmodified to provide transparency and compatibility with system software, while overhead is reduced in the lower layers. In various embodiments, the first digital interface may be other types of interfaces or modified interfaces previously described.

At block 406, the processing logic writes the plurality of non-contiguous data elements into a contiguous data block in a buffer. The buffer may be buffer 146. In an embodiment, the buffer is the memory of the computer system (e.g., buffer 146 in memory 120), and writing the plurality of non-contiguous data elements into the contiguous data block comprises initiating one or more write transactions on the second digital interface. In an embodiment, the buffer is a cache of the data transfer controller (e.g., buffer 146 in data transfer controller 140). The writes may be performed by a DMA controller of the data transfer controller.

At block 408, the processing logic provides, to the peripheral device via the first digital interface, an indication that the contiguous data block is available for transfer from the buffer to the peripheral device via the first digital interface. In an embodiment, providing the indication that the contiguous data block is available for transfer comprises releasing a semaphore, mutex, or other lock. In an embodiment, providing the indication that the contiguous data block is available for transfer comprises setting a flag or triggering an interrupt (e.g., in hardware or software). In an embodiment, the contiguous data block may be structured to enable the peripheral device to transfer the block using a single DMA transaction. The DMA transaction may be performed by a DMA controller of the peripheral device (e.g., DMA controller 134).

FIG. 4B is a flow diagram of an example method 420 for providing non-contiguous data transfer with multiple digital interfaces, in accordance with an embodiment. Method 420 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 420. Method 420 may also be associated with a set of instructions stored on a non-transitory computer-readable medium (e.g., magnetic or optical disk, etc.). The instructions, when executed by a processing device, may cause the processing device to perform operations comprising the blocks of method 420. In an embodiment, method 420 is performed by the systems of FIGS. 1A-B or components thereof (e.g., processor 102, system agent 110, memory controller 114, data transfer controller 140, etc.). In an embodiment, method 420 is performed by computing system 500 of FIG. 5. In some embodiments, blocks depicted in FIG. 4B could be performed simultaneously or in a different order than depicted. Various embodiments may include additional blocks not depicted in FIG. 4B or a subset of blocks depicted in FIG. 4B.

At block 422, processing logic of a data transfer controller connected to a first digital interface of a computer system receives an instruction to distribute a plurality of data elements of a contiguous data block to a plurality of non-contiguous addresses in a memory of the computer system, wherein the contiguous data block is associated with a peripheral device connected to the first digital interface. The data transfer controller may be data transfer controller 140 of FIG. 1A. The memory of the computer system may be memory 120 and/or process memories 124A-n. The peripheral device may be peripheral device 130. As previously described, the peripheral device may be a NIC, GPU, DPU, data storage device, or other types of devices in various embodiments. The first digital interface may be digital interfaces 132A-B and/or 142A (e.g., the data transfer controller control plane interface). The contiguous data block may be data block 304 of FIG. 3A. The data elements may be data elements 302A-n (e.g., as depicted in data block 304). The instruction may be received from software (e.g., a driver or communication library). The instruction may be received via the first digital interface. In an embodiment, the instruction may be received via the second digital interface described below.

In an embodiment, each address of the plurality of non-contiguous addresses is a virtual memory address addressable by a processor of the computer system, the data transfer controller, and the peripheral device. For example, the virtual memory addresses may be associated with a shared virtual addressing (SVA) scheme, shared virtual memory (SVM) scheme, or similar virtual address scheme. The virtual addresses may be associated with one or more process address space IDs (PASIDs) allocated and managed by an operating system.

At block 424, the processing logic receives, from the peripheral device via the first digital interface, an indication that a write transaction using the first digital interface is complete, wherein the write transaction corresponds to a transfer of the contiguous data block from the peripheral device to a buffer. In an embodiment, receiving the indication that the write transaction is complete comprises obtaining a semaphore, mutex, or other lock. In an embodiment, receiving the indication that the write transaction is complete comprises observing a flag or triggering an interrupt (e.g., in hardware or software). In an embodiment, the contiguous data block may be structured to enable the peripheral device to transfer the block using a single DMA transaction. The DMA transaction may be performed by a DMA controller of the peripheral device (e.g., DMA controller 134). The buffer may be buffer 146.

At block 426, the processing logic reads the plurality of data elements from the contiguous data block in the buffer. In an embodiment, the buffer is the memory of the computer system (e.g., buffer 146 in memory 120), and reading the plurality of data elements from the contiguous data block comprises initiating one or more read transactions on a second digital interface (e.g., data plane interface 142B). In an embodiment, the buffer is a cache of the data transfer controller (e.g., buffer 146 in data transfer controller 140). The read may be performed by a DMA controller of the data transfer controller (e.g., DMA controller 144).

At block 428, the processing logic writes, via a plurality of scatter transactions on a second digital interface, the plurality of data elements to the plurality of non-contiguous addresses in the memory of the computer system, wherein the second digital interface is connected to the data transfer controller and the memory of the computer system, and wherein the second digital interface allows for use of a subset of overhead data of the first digital interface for the plurality of scatter transactions. The second digital interface may be digital interfaces 122A-B and/or 142B (e.g., the data transfer controller data plane interface). The writes may be performed by a DMA controller of the data transfer controller (e.g., DMA controller 144).

In an embodiment, the first digital interface corresponds to a control plane of the data transfer controller and the second digital interface corresponds to a data plane of the data transfer controller. The first digital interface further corresponds to a control plane and a data plane of the peripheral device. The second digital interface further corresponds to a control plane and a data plane of the memory of the computer system. The second digital interface may provide increased bandwidth, decreased latency, and/or reduced overhead relative to the first digital interface.

In an embodiment, the first digital interface is a modified Peripheral Component Interconnect Express (PCIe) interface. A PCIe interface may include a PCIe physical layer, a PCIe data link layer, and a PCIe transaction layer. One of the PCIe physical layer or the PCIe data link layer may be absent or modified in the modified PCIe interface. The transaction layer may be unmodified to provide transparency and compatibility with system software, while overhead is reduced in the lower layers. In various embodiments, the digital interface may be other types of interfaces previously described.

FIG. 4C is a flow diagram of an example method 440 for providing non-contiguous data transfer with multiple digital interfaces, in accordance with an embodiment. Method 440 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 440. Method 440 may also be associated with a set of instructions stored on a non-transitory computer-readable medium (e.g., magnetic or optical disk, etc.). The instructions, when executed by a processing device, may cause the processing device to perform operations comprising the blocks of method 440. In an embodiment, method 440 is performed by the systems of FIGS. 1A-B or components thereof (e.g., processor 102, system agent 110, memory controller 114, data transfer controller 140, etc.). In an embodiment, method 440 is performed by computing system 500 of FIG. 5. In some embodiments, blocks depicted in FIG. 4C could be performed simultaneously or in a different order than depicted.

Various embodiments may include additional blocks not depicted in FIG. 4C or a subset of blocks depicted in FIG. 4C.

At block 442, processing logic of a data transfer controller connected to a first digital interface of a computer system receives an instruction to transfer a plurality of non-contiguous data elements from a first process memory space in a memory of the computer system to a plurality of respective non-contiguous addresses in a second process memory space in the memory of the computer system. The data transfer controller may be data transfer controller 140 of FIG. 1A. The memory of the computer system may be memory 120. The first and second process memories may be process memories of process memories 124A-n. The first digital interface may be digital interfaces 132A-B and/or 142A (e.g., the data transfer controller control plane interface). The non-contiguous data elements may be data elements 302A-n of FIG. 3B as depicted in process memory 124A. The respective non-contiguous addresses may correspond to data elements 302A-n as depicted in process memory 124B. The instruction may be received from software (e.g., a driver or communication library). The instruction may be received via the first digital interface. In an embodiment, the instruction may be received via the second digital interface described below.

In an embodiment, each address of the plurality of respective non-contiguous addresses is a virtual memory address addressable by a processor of the computer system, the data transfer controller, and a peripheral device. For example, the virtual memory addresses may be associated with a shared virtual addressing (SVA) scheme, shared virtual memory (SVM) scheme, or similar virtual address scheme. The virtual addresses may be associated with one or more process address space IDs (PASIDs) allocated and managed by an operating system. The peripheral device may be peripheral device 130. As previously described, the peripheral device may be a NIC, GPU, DPU, data storage device, or other types of devices in various embodiments.

At block 444, the processing logic reads, via a plurality of gather transactions on a second digital interface, the plurality of non-contiguous data elements from the first process memory space, wherein the second digital interface is connected to the data transfer controller and the memory of the computer system, and wherein the second digital interface allows for use of a subset of overhead data of the first digital interface for the plurality of gather transactions. The second digital interface may be digital interfaces 122A-B and/or 142B (e.g., the data transfer controller data plane interface). The read may be performed by a DMA controller of the data transfer controller (e.g., DMA controller 144).

In an embodiment, the first digital interface corresponds to a control plane of the data transfer controller and the second digital interface corresponds to a data plane of the data transfer controller. The second digital interface further corresponds to a control plane and a data plane of the memory of the computer system. The second digital interface may provide increased bandwidth, decreased latency, and/or reduced overhead relative to the first digital interface. In an embodiment, a peripheral device (e.g., NIC, GPU, DPU, etc.) is connected to the first digital interface, and a data transaction of the peripheral device uses the first digital interface. The first digital interface can correspond to a control plane and a data plane of the peripheral device.

In an embodiment, the first digital interface is a modified Peripheral Component Interconnect Express (PCIe) interface. A PCIe interface may include a PCIe physical layer, a PCIe data link layer, and a PCIe transaction layer. One of the PCIe physical layer or the PCIe data link layer may be absent or modified in the modified PCIe interface. The transaction layer may be unmodified to provide transparency and compatibility with system software, while overhead is reduced in the lower layers. In various embodiments, the digital interface may be other types of interfaces previously described.

At block 446, the processing logic writes, via a plurality of scatter transactions on the second digital interface, the plurality of non-contiguous data elements to the plurality of respective non-contiguous addresses in the second process memory space. The writes may be performed by a DMA controller of the data transfer controller. In an embodiment, the processing logic provides an indication to software (e.g., a driver or communication library) that the transfer is complete. The indication may be provided via the first digital interface and may correspond to a semaphore, flag, interrupt, or other type of indication previously described.

Figure 5:
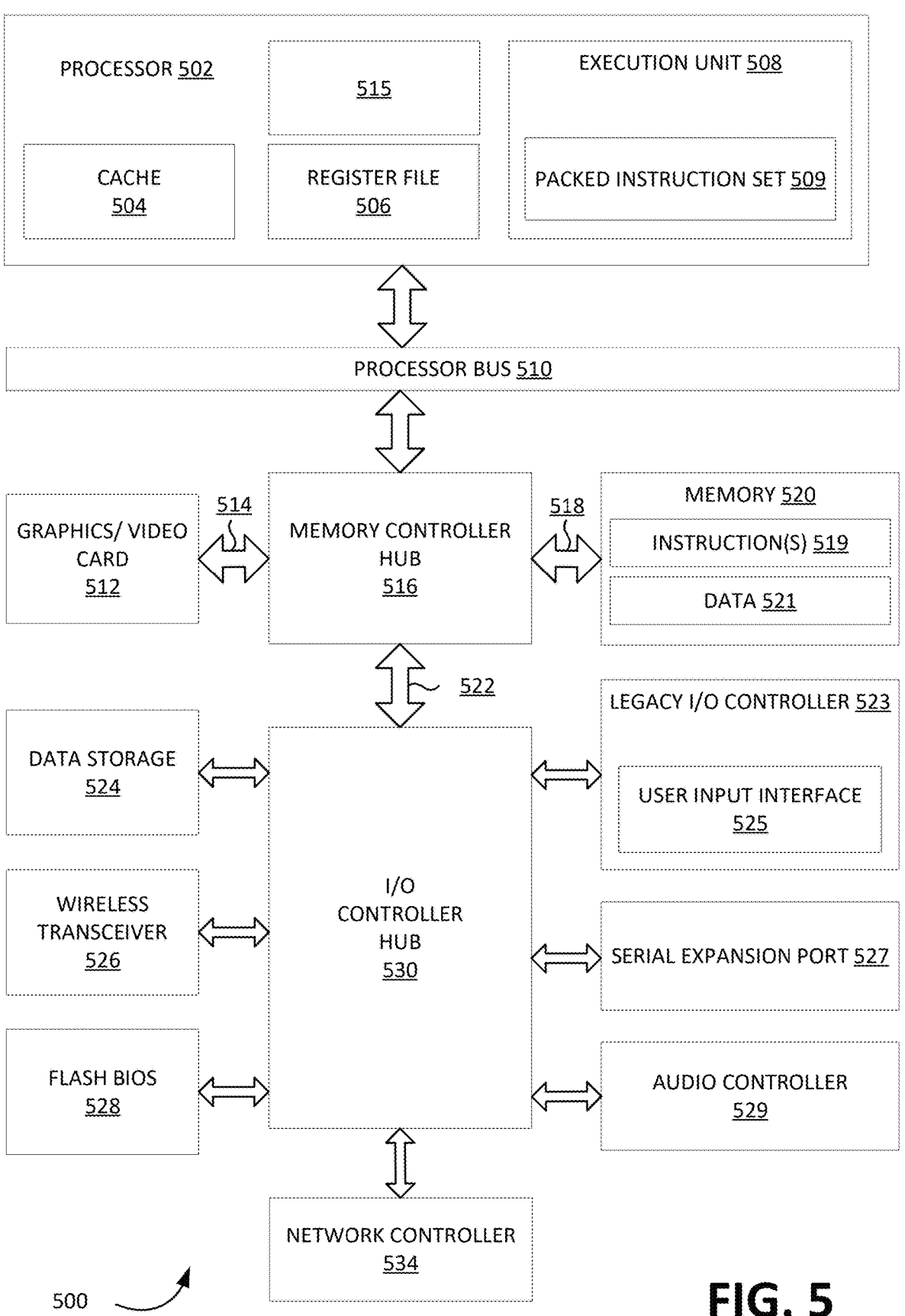
FIG. 5 illustrates an example computer system, in accordance with an embodiment.

FIG. 5 is a block diagram illustrating an exemplary computer system, which may be a system with interconnected devices and components, a system-on-a-chip (SOC) or some combination thereof 500 formed with a processor that may include execution units to execute an instruction, according to at least one embodiment. In at least one embodiment, computer system 500 may include, without limitation, a component, such as a processor 502 to employ execution units including logic to perform algorithms for process data, in accordance with present disclosure, such as in embodiment described herein. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 500 may include, without limitation, processor 502 that may include, without limitation, one or more execution units 508 to perform machine learning model training and/or inferencing according to techniques described herein. In at least one embodiment, computer system 500 is a single processor desktop or server system, but in another embodiment computer system 500 may be a multiprocessor system. In at least one embodiment, processor 502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. Other embodiments may also include a combination of both internal and external caches depending on particular implementation and needs. In at least one embodiment, register file 506 may store different types of data in various registers including, without limitation, integer registers, floating point registers, status registers, and instruction pointer register.

In at least one embodiment, execution unit 508, including, without limitation, logic to perform integer and floating-point operations, also resides in processor 502. In at least one embodiment, processor 502 may also include a microcode ("ucode") read-only memory ("ROM") that stores microcode for certain macro instructions. In at least one embodiment, execution unit 508 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 508 may also be used in microcontrollers, embedded processors, graphics devices, DSPs, and other types of logic circuits. In at least one embodiment, computer system 500 may include, without limitation, a memory 520. In at least one embodiment, memory 520 may be implemented as a Dynamic Random Access Memory ("DRAM") device, a Static Random Access Memory ("SRAM") device, flash memory device, or other memory device. In at least one embodiment, memory 520 may store instruction(s) 519 and/or data 521 represented by data signals that may be executed by processor 502.

In at least one embodiment, system logic chip may be coupled to processor bus 510 and memory 520. In at least one embodiment, system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through a high bandwidth memory path 518 and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, local I/O bus may include, without limitation, a high-speed I/O bus for connecting peripherals to memory 520, chipset, and processor 502. Examples may include, without limitation, an audio controller 529, a firmware hub ("flash BIOS") 528, a wireless transceiver 526, a data storage 524, a legacy I/O controller 523 containing user input and keyboard interfaces 525, a serial expansion port 527, such as Universal Serial Bus ("USB"), and a network controller 534, which may include in some embodiments, a data processing unit. Data storage 524 may comprise a hard disk drive, a floppy disk drive, a CD-ROM device, a flash memory device, or other mass storage device.

In at least one embodiment, FIG. 5 illustrates a system, which includes interconnected hardware devices or "chips," whereas in other embodiments, FIG. 5 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 500 are interconnected using compute express link (CXL) interconnects.

Figure 6:
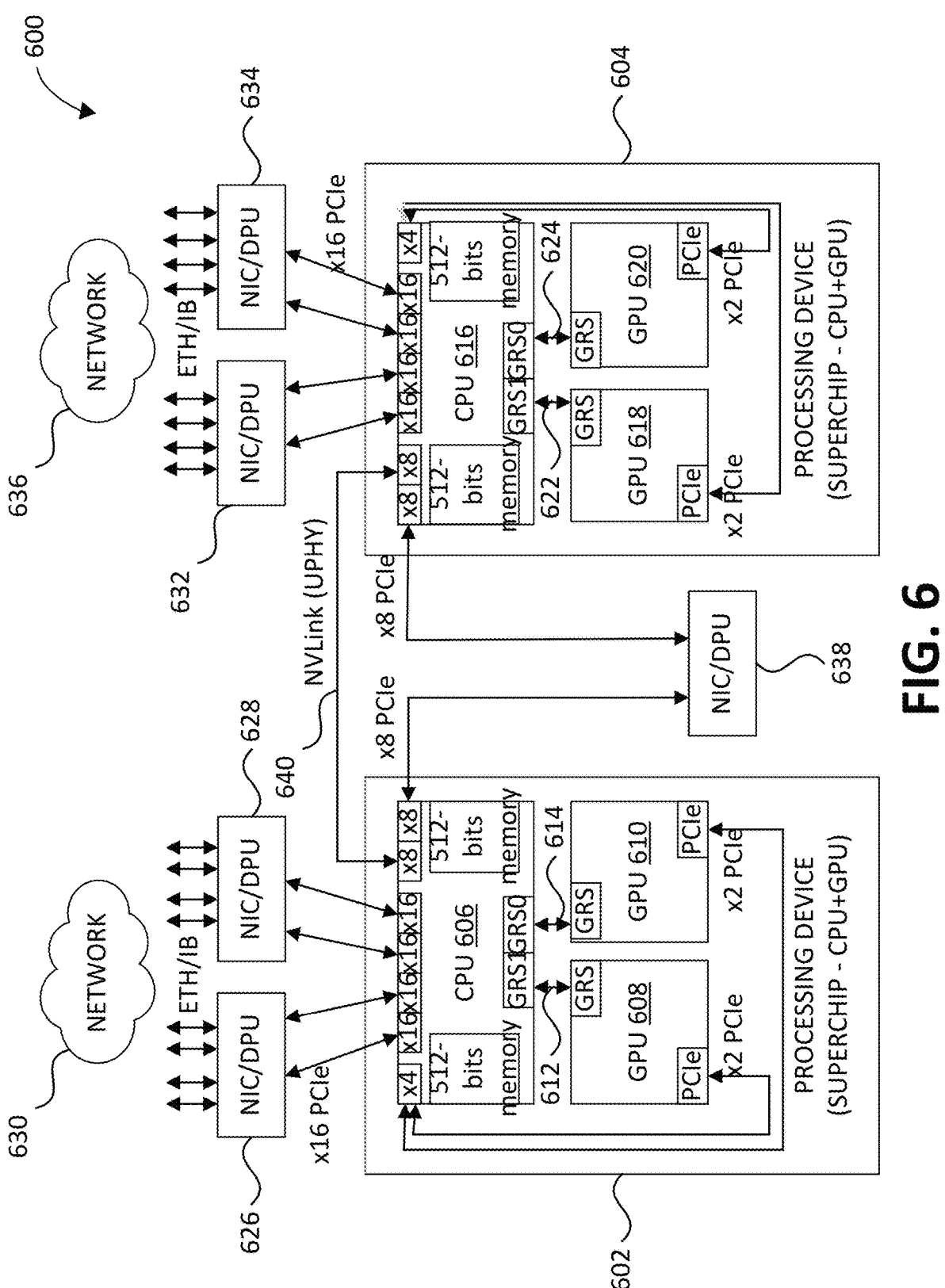
FIG. 6 is a block diagram of a computing system having two processing devices coupled to each other and multiple networks, in accordance with an embodiment.

FIG. 6 is a block diagram of a computing system 600 having two processing devices coupled to each other and multiple networks according to at least one embodiment. The computing system 600 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 600. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 600 highly suitable for demanding applications that require significant processing power, such as artificial intelligence (AI), machine learning (ML), and data-intensive computing, while ensuring robust connectivity and scalability across various networked environments. The integrated circuits of the computing system 600 can include one or more CPUs and one or more GPUs. An example architecture of a multi-GPU architecture is illustrated in FIG. 6.

As illustrated in FIG. 6, the computing system 600 includes a processing device 602 with a multi-GPU architecture. In particular, the processing device 602 includes a CPU 606, a GPU 608, and a GPU 610. The CPU 606 can be coupled to the GPU 608 via an die-to-die (D2D) or chip-to-chip (C2C) interconnect 612, such as a Ground-Referenced Signaling interconnect (GRS interconnect). The CPU 606 can be coupled to the GPU 610 via a D2D or C2C interconnect 614. The CPU 606 can also couple to the GPU 608 and GPU 610 via PCIe interconnects. The CPU 606 can be coupled to one or more network interface cards (NICs) or data processing units (DPUs), which are coupled to one or more networks. For example, as illustrated in FIG. 6, the CPU 606 is coupled to a first NIC/DPU 626, which is coupled to a network 630. The CPU 606 is also coupled to a second NIC/DPU 628, which is coupled to the network 630. The NIC/DPU 626 and NIC/DPU 628 can be coupled to the network 630 over Ethernet (ETH) or InfiniBand (IB) connections.

The computing system 600 also includes a processing device 604 with a multi-GPU architecture. In particular, the processing device 604 includes a CPU 616, a GPU 618, and a GPU 620. The CPU 616 can be coupled to the GPU 618 via an D2D or C2C interconnect 622. The CPU 616 can be coupled to the GPU 620 via a D2D or C2C interconnect 624. The CPU 616 can also couple to the GPU 618 and GPU 620 via PCIe interconnects. The CPU 616 can be coupled to one or more NICs or DPUs, which are coupled to one or more networks. For example, as illustrated in FIG. 6, the CPU 616 is coupled to a first NIC/DPU 632, which is coupled to a network 636. The CPU 616 is also coupled to a second NIC/DPU 634, which is coupled to the network 636. The NIC/DPU 632 and NIC/DPU 634 can be coupled to the network 636 over Ethernet (ETH) or InfiniBand (IB) connections.

In at least one embodiment, the processing device 602 and the processing device 604 can communication with each other via a NIC/DPU 638, such as over PCIe interconnects. The processing device 602 and processing device 604 can also communicate with each other over a high-bandwidth communication interconnects 640, such as an NVLink interconnect or other high-speed interconnects.

In at least one embodiment, the computing system 600 is used for high-speed network communication and includes a processing unit (e.g., CPU 606, GPU 608, GPU 610, CPU 616, GPU 618, GPU 620, NIC/DPU 626, NIC/DPU 628, NIC/DPU 632, NIC/DPU 634, or NIC/DPU 638), a network interface coupled to the processing unit, and a data transfer controller coupled to the processing unit and/or the network interface. The data transfer controller may provide data transfer functions for non-contiguous data and other types of irregular data that the network interface (or other peripheral component) may be unable to transfer efficiently. An example data transfer controller is further described with reference to FIG. 1.

Figure 7:
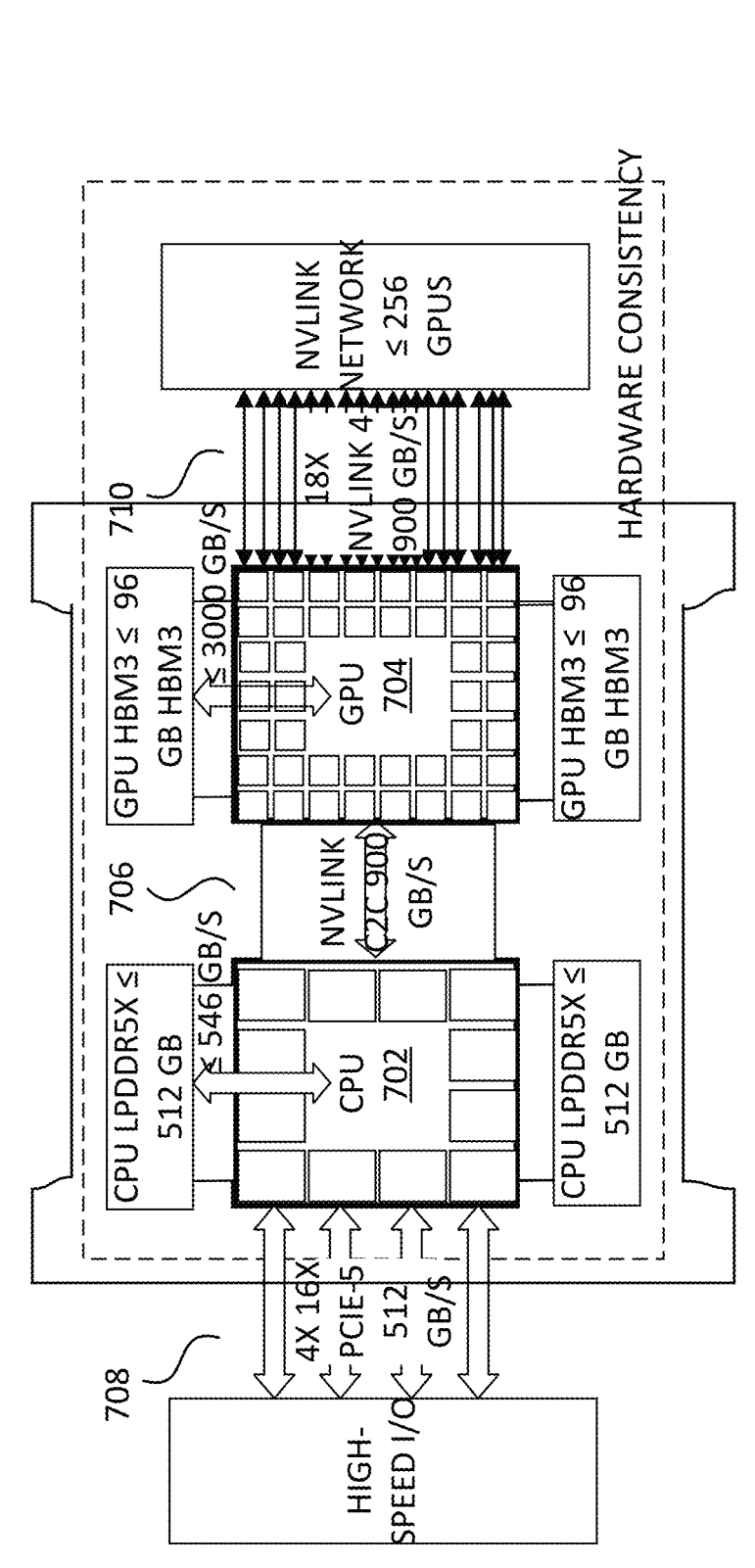
FIG. 7 is a block diagram of a computing system having a CPU and a GPU in a single integrated circuit, in accordance with an embodiment.

FIG. 7 is a block diagram of a computing system 700 having a CPU 702 and a GPU 704 in a single integrated circuit according to at least one embodiment. The computing system 700 can be a highly integrated design where a CPU 702 and GPU 704 are connected on a single integrated circuit, utilizing an NVLink C2C (Chip-to-Chip) interconnect 706 to enable fast, low-latency communication between the two processing units. This close integration allows for efficient data transfer and parallel processing between the CPU 702 and GPU 704, optimizing performance for complex computational tasks. The GPU elements within the computing system 700 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 710. Additionally, the computing system 700 can be designed to interface with a high-speed I/O through PCIe interconnects 708, ensuring rapid data transfer to and from external devices, further enhancing the system's capabilities in handling data-intensive tasks and providing robust connectivity to peripheral components. It should be noted that the C2C interconnects 706 can be considered D2D interconnects since the CPU 702 and the GPU 704 are located on the same integrated circuit. The integrated circuit can include CPU memory (also referred to as main memory) and GPU memory, which are accessible by the CPU 702 and the GPU 704, respectively, over high-speed interconnects. The computing system 700 can bring together performance of the GPU 704 with the versatility of the CPU 702. The CPU 702 can be connected with a high-bandwidth and memory coherent C2C interconnects 706 in a single integrated circuit. The computing system 700 can support a link switch system.

In at least one embodiment, the computing system 700 is used for high-speed network communication and includes a processing unit (e.g., CPU 702, GPU 704, NVLink network), and a network interface coupled to the processing unit, and a data transfer controller coupled to the processing unit and/or the network interface. The data transfer controller may provide data transfer functions for non-contiguous data and other types of irregular data that the network interface (or other peripheral component) may be unable to transfer efficiently. An example data transfer controller is further described with reference to FIG. 1.

Figure 8:
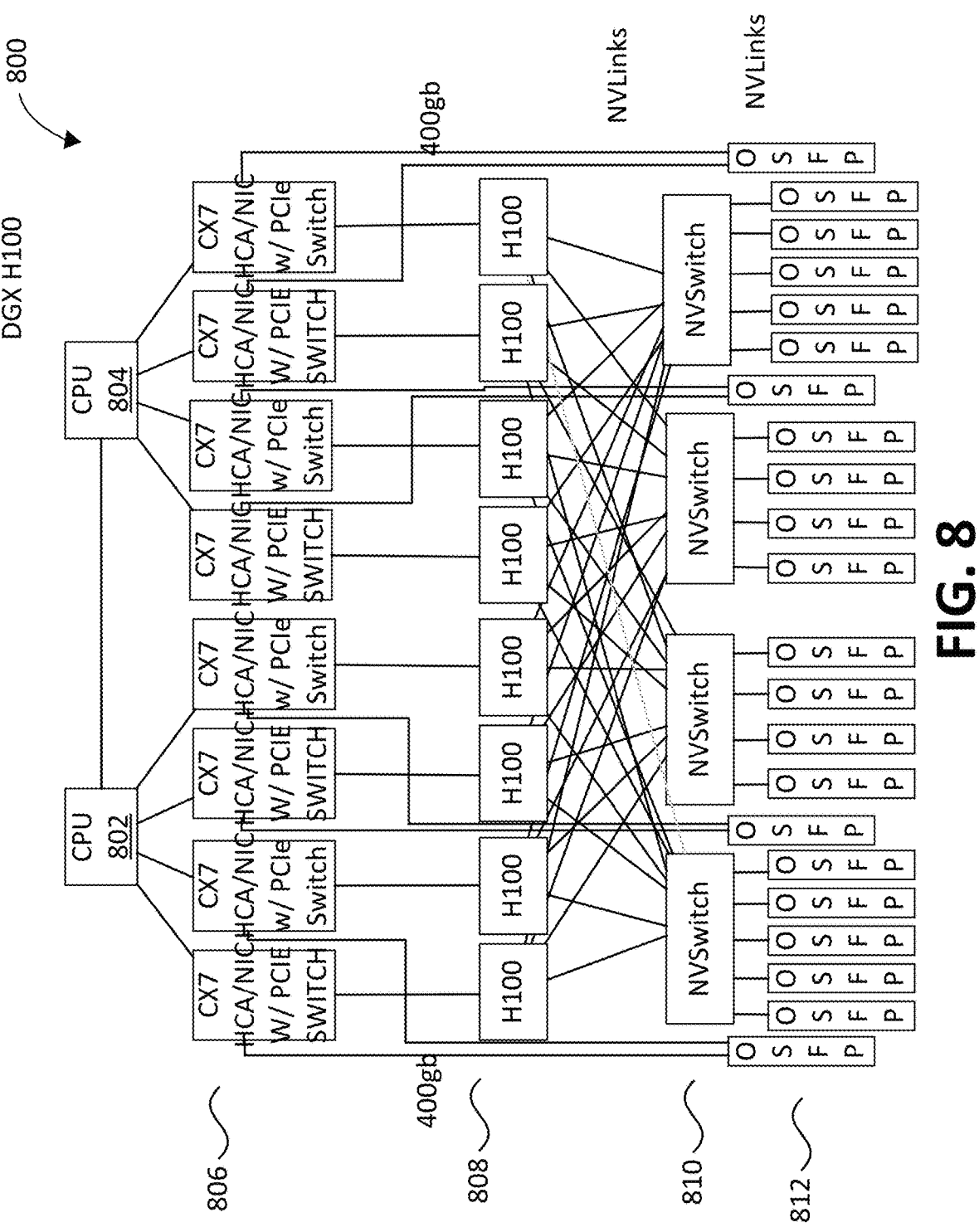
FIG. 8 is a block diagram of a computing system having tensor core GPUs, in accordance with an embodiment.

FIG. 8 is a block diagram of a computing system 800 having tensor core GPUs 808 according to at least one embodiment. The computing system 800 can be a DGX H100 system, which is a high-performance computing platform designed to meet the demands of AI, ML, and deep learning (DL) workloads. The computing system 800 can include multiple tensor core GPUs 808 (e.g., NVIDIA H100 Tensor Core GPUs). The tensor core GPUs 808 can each be one of the integrated circuits described above with respect to FIG. 7. The tensor core GPUs 808 can be optimized for AI/ML/DL applications, offering exceptional performance for deep learning training, inference, and high-performance computing tasks. The tensor core GPUs 808 within the computing system 800 are interconnected using high-speed communication interfaces like NVLinks, enabling rapid data transfer between them, which is crucial for handling large-scale AI models and datasets with low latency. This computing system 800 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 808, the computing system 800 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 808 for their specific applications. The computing system 800 is ideally suited for large-scale AI model training, real-time inference, scientific simulations, data analytics, and other compute-intensive tasks that require massive parallel processing power.

The tensor core GPUs 808 can be coupled to multiple CPUs, such as CPU 802 and CPU 804, using switches 806 (e.g., CX7 HCA/NIC with PCIe switch). The tensor core GPUs 808 can be coupled to each other via switches 810 (e.g., NVSwitches). The switches 806 and switches 810 can be coupled to high-speed transceiver modules 812. The high-speed transceiver modules 812 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 800 remains capable of meeting increasing data demands and can be upgraded to support future advancements in network speeds, thus contributing to the system's overall performance and scalability.

In at least one embodiment, the computing system 800 can be considered a data-network configuration with full-bandwidth intra-server NVLinks. In this example, all eight tensor core GPUs 808 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 808 can half-subscribe eighteen NVLinks to GPUs in other servers. Four tensor core GPUs 808 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 808 can independently transfer data, using Remote Direct Memory Access (RDMA) protocol, over its own dedicated switch (e.g., 400 Gb/s HCA/NIC) in a multi-rail InfiniBand/Ethernet configuration. In this example, 800 GBps of aggregate full-duplex to non-NVLink network devices.

In at least one embodiment, the computing system 800 is used for high-speed network communication and includes a processing unit (e.g., CPU 802, CPU 802, switches 806, tensor core GPUs 808, switches 810, high-speed transceiver modules 812), and a network interface coupled to the processing unit, and a data transfer controller coupled to the processing unit and/or the network interface. The data transfer controller may provide data transfer functions for non-contiguous data and other types of irregular data that the network interface (or other peripheral component) may be unable to transfer efficiently. An example data transfer controller is further described with reference to FIG. 1.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving, by a data transfer controller connected to a first digital interface of a computer system, an instruction to prepare a plurality of non-contiguous data elements in a memory of the computer system for transfer to a peripheral device connected to the first digital interface;

reading, via a plurality of gather transactions on a second digital interface, the plurality of non-contiguous data elements from the memory of the computer system, wherein the second digital interface is connected to the data transfer controller and the memory of the computer system, wherein the second digital interface allows for use of a subset of overhead data of the first digital interface for the plurality of gather transactions, and wherein the subset of overhead data of the first digital interface for the plurality of gather transactions comprises at least one of: source/destination addresses, packet headers, cyclic redundancy check (CRC) values, parity bits, timestamps, version numbers, or data types;

writing the plurality of non-contiguous data elements into a contiguous data block in a buffer; and providing, to the peripheral device via the first digital interface, an indication that the contiguous data block is available for transfer from the buffer to the peripheral device via the first digital interface.

2. The method of claim 1, wherein:

the first digital interface corresponds to a control plane of the data transfer controller and the second digital interface corresponds to a data plane of the data transfer controller;

the first digital interface corresponds to a control plane and a data plane of the peripheral device; and the second digital interface corresponds to a control plane and a data plane of the memory of the computer system.

3. The method of claim 2, wherein:

a PCIe interface comprises a PCIe physical layer, a PCIe data link layer, and a PCIe transaction layer;

the first digital interface is a modified Peripheral Component Interconnect Express (PCIe) interface; and one of the PCIe physical layer or the PCIe data link layer is absent or modified in the modified PCIe interface.

4. The method of claim 1, wherein:

the received instruction comprises a plurality of non-contiguous virtual memory addresses each addressable by a processor of the computer system, the data transfer controller, and the peripheral device; and each address of the plurality of non-contiguous virtual memory addresses is associated with a respective data element of the plurality of non-contiguous data elements.

5. The method of claim 1, wherein the buffer is one of:

the memory of the computer system, wherein writing the plurality of non-contiguous data elements into the contiguous data block comprises initiating one or more write transactions on the second digital interface; or a cache of the data transfer controller.

6. The method of claim 1, wherein providing the indication that the contiguous data block is available for transfer comprises one of: releasing a semaphore, setting a flag, or triggering an interrupt.

7. The method of claim 1, wherein the peripheral device is a network interface controller (NIC).

8. A method comprising:

receiving, by a data transfer controller connected to a first digital interface of a computer system, an instruction to distribute a plurality of data elements of a contiguous data block to a plurality of non-contiguous addresses in a memory of the computer system, wherein the contiguous data block is associated with a peripheral device connected to the first digital interface;

receiving, from the peripheral device via the first digital interface, an indication that a write transaction using the first digital interface is complete, wherein the write transaction corresponds to a transfer of the contiguous data block from the peripheral device to a buffer;

reading the plurality of data elements from the contiguous data block in the buffer; and writing, via a plurality of scatter transactions on a second digital interface, the plurality of data elements to the plurality of non-contiguous addresses in the memory of the computer system, wherein the second digital interface is connected to the data transfer controller and the memory of the computer system, wherein the second digital interface allows for use of a subset of overhead data of the first digital interface for the plurality of scatter transactions, and wherein the subset of overhead data of the first digital interface for the plurality of scatter transactions comprises at least one of: source/destination addresses, packet headers, cyclic redundancy check (CRC) values, parity bits, timestamps, version numbers, or data types.

9. The method of claim 8, wherein:

the first digital interface corresponds to a control plane of the data transfer controller and the second digital interface corresponds to a data plane of the data transfer controller;

the first digital interface corresponds to a control plane and a data plane of the peripheral device; and the second digital interface corresponds to a control plane and a data plane of the memory of the computer system.

10. The method of claim 9, wherein:

a PCIe interface comprises a PCIe physical layer, a PCIe data link layer, and a PCIe transaction layer;

The first digital interface is a modified Peripheral Component Interconnect Express (PCIe) interface; and one of the PCIe physical layer or the PCIe data link layer is absent or modified in the modified PCIe interface.

11. The method of claim 8, wherein each address of the plurality of non-contiguous addresses is a virtual memory address addressable by a processor of the computer system, the data transfer controller, and the peripheral device.

12. The method of claim 8, wherein the buffer is one of:

the memory of the computer system, wherein reading the plurality of data elements from the contiguous data block comprises initiating one or more read transactions on the second digital interface; or a cache of the data transfer controller.

13. The method of claim 8, wherein receiving the indication that the write transaction is complete comprises one of: obtaining a semaphore, reading a flag, or receiving an interrupt.

14. The method of claim 8, wherein the peripheral device is a network interface controller (NIC).

15. A method comprising:

receiving, by a data transfer controller connected to a first digital interface of a computer system, an instruction to transfer a plurality of non-contiguous data elements from a first process memory space in a memory of the computer system to a plurality of respective non-contiguous addresses in a second process memory space in the memory of the computer system;

reading, via a plurality of gather transactions on a second digital interface, the plurality of non-contiguous data elements from the first process memory space, wherein the second digital interface is connected to the data transfer controller and the memory of the computer system, wherein the second digital interface allows for use of a subset of overhead data of the first digital interface for the plurality of gather transactions, and wherein the subset of overhead data of the first digital interface for the plurality of gather transactions comprises at least one of: source/destination addresses, packet headers, cyclic redundancy check (CRC) values, parity bits, timestamps, version numbers, or data types; and writing, via a plurality of scatter transactions on the second digital interface, the plurality of non-contiguous data elements to the plurality of respective non-contiguous addresses in the second process memory space.

16. The method of claim 15, wherein:

the first digital interface corresponds to a control plane of the data transfer controller and the second digital interface corresponds to a data plane of the data transfer controller; and the second digital interface corresponds to a control plane and a data plane of the memory of the computer system.

17. The method of claim 16, wherein a peripheral device is connected to the first digital interface, and wherein a data transaction of the peripheral device uses the first digital interface.

18. The method of claim 16, wherein:

a PCIe interface comprises a PCIe physical layer, a PCIe data link layer, and a PCIe transaction layer;

the first digital interface is a modified Peripheral Component Interconnect Express (PCIe) interface; and one of the PCIe physical layer or the PCIe data link layer is absent or modified in the modified PCIe interface.

19. The method of claim 15, wherein each address of the plurality of respective non-contiguous addresses is a virtual memory address addressable by a processor of the computer system, the data transfer controller, and a peripheral device.

20. The method of claim 19, wherein the peripheral device is a network interface controller (NIC).

21. A system for high-speed network communication in a data center, the system comprising:

one or more processing units;

a memory coupled to the one or more processing units;

a network interface coupled to the one or more processing units and the memory; and a data transfer controller coupled to the one or more processing units, the memory, and the network interface, wherein the data transfer controller is to perform operations comprising:

receiving, from the one or more processing units via a first digital interface, an instruction to prepare a plurality of non-contiguous data elements in the memory for transfer to the network interface, wherein the network interface is connected to the first digital interface;

reading, via a plurality of gather transactions on a second digital interface, the plurality of non-contiguous data elements from the memory, wherein the second digital interface is connected to the data transfer controller and the memory, and wherein the second digital interface allows for use of a subset of overhead data of the first digital interface for the plurality of gather transactions, and wherein the subset of overhead data of the first digital interface for the plurality of gather transactions comprises at least one of: source/destination addresses, packet headers, cyclic redundancy check (CRC) values, parity bits, timestamps, version numbers, or data types;

writing the plurality of non-contiguous data elements into a contiguous data block in a buffer; and providing, to the network interface via the first digital interface, an indication that the contiguous data block is available for transfer from the buffer to the network interface via the first digital interface.

22. The system of claim 21, wherein:

the first digital interface corresponds to a control plane of the data transfer controller and the second digital interface corresponds to a data plane of the data transfer controller;

the first digital interface corresponds to a control plane and a data plane of the network interface; and the second digital interface corresponds to a control plane and a data plane of the memory.

23. The system of claim 22, wherein:

a PCIe interface comprises a PCIe physical layer, a PCIe data link layer, and a PCIe transaction layer;

the first digital interface is a modified Peripheral Component Interconnect Express (PCIe) interface; and one of the PCIe physical layer or the PCIe data link layer is absent or modified in the modified PCIe interface.

24. The system of claim 21, wherein:

the received instruction comprises a plurality of non-contiguous virtual memory addresses each addressable by the one or more processing units, the data transfer controller, and the network interface; and each address of the plurality of non-contiguous virtual memory addresses is associated with a respective data element of the plurality of non-contiguous data elements.

25. The system of claim 21, wherein the buffer is one of:

the memory, wherein writing the plurality of non-contiguous data elements into the contiguous data block comprises initiating one or more write transactions on the second digital interface; or a cache of the data transfer controller.

26. The system of claim 21, wherein providing the indication that the contiguous data block is available for transfer comprises one of: releasing a semaphore, setting a flag, or triggering an interrupt.

* * * * *